United States Patent
Yao et al.

(10) Patent No.: US 12,273,889 B2
(45) Date of Patent: Apr. 8, 2025

(54) ENHANCED UPLINK TRANSMISSION IN WIRELESS COMMUNICATION

(71) Applicant: Apple Inc., Cupertino, CA (US)

(72) Inventors: Chunhai Yao, Beijing (CN); Hong He, San Jose, CA (US); Chunxuan Ye, San Diego, CA (US); Dawei Zhang, Saratoga, CA (US); Haitong Sun, Cupertino, CA (US); Jie Cui, San Jose, CA (US); Oghenekome Oteri, San Diego, CA (US); Sigen Ye, Whitehouse Station, NJ (US); Wei Zeng, Saratoga, CA (US); Weidong Yang, San Diego, CA (US); Yang Tang, San Jose, CA (US); Yushu Zhang, Beijing (CN)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/442,464

(22) PCT Filed: May 15, 2020

(86) PCT No.: PCT/CN2020/090517
§ 371 (c)(1),
(2) Date: Sep. 23, 2021

(87) PCT Pub. No.: WO2021/227009
PCT Pub. Date: Nov. 18, 2021

(65) Prior Publication Data
US 2023/0054292 A1    Feb. 23, 2023

(51) Int. Cl.
*H04L 5/00*      (2006.01)
*H04W 72/23*    (2023.01)

(52) U.S. Cl.
CPC ........... *H04W 72/23* (2023.01); *H04L 5/0094* (2013.01)

(58) Field of Classification Search
CPC . H04W 72/23; H04W 72/51; H04W 74/0833; H04L 5/0094; H04L 5/0053;
(Continued)

(56) References Cited

U.S. PATENT DOCUMENTS

2019/0230706 A1   7/2019   Li et al.
2022/0123885 A1*   4/2022   Shin ................ H04W 74/0833

FOREIGN PATENT DOCUMENTS

CN    110120830 A    8/2019
CN    110958085 A    4/2020
(Continued)

OTHER PUBLICATIONS

Ericsson (Coexistence of NB-IoT with NR, R1-1905968, May 2019).*
(Continued)

*Primary Examiner* — Lakeram Jangbahadur
(74) *Attorney, Agent, or Firm* — Kubota & Basol LLP

(57) ABSTRACT

A user equipment (UE), or other network component can operate to configure different sets of resources including different sequence lengths for an uplink (UL) transmission via a UL channel. A first length or at least one of different second lengths can be selected to configure the UL transmission based on one or more conditions, which can include a coexisting radio access technology (RAT), a UE capability, an occupied channel bandwidth (OCB), the type of UL transmission or the like. The UL transmission can be based on at least one of: the first or the second sequence length such as for an initial access procedure based on the coexisting RAT and the OCB, for example.

20 Claims, 10 Drawing Sheets

(58) Field of Classification Search
CPC ... H04L 5/0062; H04L 5/0064; H04L 1/0007; H04L 27/0006; H04L 27/26025; H04L 27/2607; H04J 13/16
See application file for complete search history.

(56) References Cited

FOREIGN PATENT DOCUMENTS

| | | | | | |
|---|---|---|---|---|---|
| EP | 3644531 | A1 | * | 4/2020 | ............ H04J 13/22 |
| WO | 2018/085044 | A1 | | 5/2018 | |
| WO | 2018137200 | A1 | | 8/2018 | |
| WO | WO-2018235298 | A1 | * | 12/2018 | ............ H04J 13/22 |
| WO | 2019029362 | A1 | | 2/2019 | |
| WO | 2019/215670 | A1 | | 11/2019 | |
| WO | 2019/215918 | A1 | | 11/2019 | |
| WO | 2021/152865 | A1 | | 8/2021 | |

OTHER PUBLICATIONS

Nokia ( Remaining issues on Initial Access Signals and Channels for NR-U, R1-2000500, Feb. 2020).*
PCT Search Report dated Feb. 3, 2021 in connection with PCT Application No. PCT/CN2020/090475.
PCT Written Opinion dated Feb. 3, 2021 in connection with PCT Application No. PCT/CN2020/090475.
Ericsson; "Corrections to NR-based access to unlicensed spectrum 30" 3GPP TSG RAN WG1; Meeting #100b-e; R1-2003161; Apr. 30, 2020.
Ericsson; "MsgA transmission for NR-U"; 3GPP TSG-RAN WG2; #109 electronic; R2-2000393; Mar. 6, 2020.
PCT Search Report dated Jan. 27, 2021 in connection with PCT Application No. PCT/CN2020/090517.
PCT Written Opinion dated Jan. 27, 2021 in connection with PCT Application No. PCT/CN2020/090517.
Ericsson; "Coexistence of NB-IoT with NR"; 3GPP TSG RAN WG1; Meeting #97; R1-1905968; May 17, 2019.
Ericsson; "Coexistence of LTE-MTC with NR"; 3GPP TSG RAN WG1; Meeting #97; R1-1905959; May 17, 2019.
U.S. Appl. No. 17/442,478, filed Sep. 23, 2021.
Extended European Search Report received for European Patent Application No. 20935999.1, mailed on Jan. 30, 2024, 11 pages.
Search Report received for Chinese Patent Application No. 202080100806.1, mailed on Apr. 28, 2024, 5 pages (2 pages of English Translation and 3 pages of Official Copy).
Apple Inc., "PRACH Preamble for NR-U", 3GPP TSG RAN WG1 adhoc_NR_AH_19 01 R1-1900739; Available online at: URL:http://www.3gpp.org/ftp/tsg_ran/WG1_RL1/TSGR1_AH/NR_AH_1901/Docs/R1-1900739.zip, Jan. 21-25, 2019, 7 pages.
Ericsson, "Initial Access Signals and Channels", 3GPP Draft, R1-1912706, 3rd Generation Partnership Project (3GPP), vol. RAN WG1, No. Reno, Nov. 18-22, 2019, 22 pages.
Intel Corporation, "Initial Access Signals/channels for NR-unlicensed", 3GPP TSG RAN WG1 Meeting #98 R1-1908621, Aug. 26-30, 2019, 17 pages.
Nokia, "Remaining Issues on Initial Access Signals and Channels for NR-U", 3GPP TSG RAN WG1 Meeting #100e R1-2000500, Feb. 24-28, 2020, 10 pages.
Nokia, Nokia Shanghai Bell, "On 2-step RACH BS Demodulation Requirements", 3GPP TSG RAN WG4 #94_e R4-2001491, Available online at: URL:https://www.3gpp.org/ftp/tsg_ran/WG4_Radio/TSGR4_94_e/Docs/R4-2001491.zip, Feb. 24-Mar. 6, 2019, 11 pages.
"Feature lead summary on initial access signals and channels for NR-U," 3GPP TSG RAN WG1 Meeting #99, R1-1913491, Reno, Nevada, US, Nov. 18-22, 2019, 52 pages.
"Draft Report of 3GPP TSG RAN WG1 #99 v0.2.0" 3GPP TSG RAN WG1 Meeting #100, R1-20xxxxx, Athens, Greece, Feb. 24-28, 2020, 162 pages.

* cited by examiner

ENHANCED UPLINK TRANSMISSION IN WIRELESS COMMUNICATION

REFERENCE TO RELATED APPLICATIONS

This application is a National Phase entry application of International Patent Application No. PCT/CN2020/090517 filed May 15, 2020, entitled "ENHANCED UPLINK TRANSMISSION IN WIRELESS COMMUNICATION", the contents of which are herein incorporated by reference in their entirety.

FIELD

The present disclosure relates to wireless technology, including to enhancing uplink (UL) transmission in wireless communications.

BACKGROUND

Mobile communication in the next generation wireless communication system, 5G, or new radio (NR) network will provide ubiquitous connectivity and access to information, as well as ability to share data, around the globe. 5G networks and network slicing will be a unified, service-based framework that will target to meet versatile and sometimes, conflicting performance criteria and provide services to vastly heterogeneous application domains ranging from Enhanced Mobile Broadband (eMBB) to massive Machine-Type Communications (mMTC), Ultra-Reliable Low-Latency Communications (URLLC), and other communications. In general, NR will evolve based on third generation partnership project (3GPP) long term evolution (LTE)-Advanced technology with additional enhanced radio access technologies (RATs) to enable seamless and faster wireless connectivity solutions.

Mobile communication has evolved significantly from early voice systems to today's highly sophisticated integrated communication platform. The next generation wireless communication system, 5G, or new radio (NR) will provide access to information and sharing of data anywhere, anytime by various users and applications. NR is expected to be a unified network/system that target to meet vastly different and sometime conflicting performance dimensions and services. Such diverse multi-dimensional requirements are driven by different services and applications. In general, NR will evolve based on 3GPP LTE-Advanced with additional potential new Radio Access Technologies (RATs) to enrich people lives with better, simple and seamless wireless connectivity solutions. NR will enable everything connected by wireless and deliver fast, rich contents and services.

Recently, the first release on NR (5G) specification provided a baseline set of features and components for future cellular communication systems. Each year, the number of mobile devices connected to wireless networks significantly increases. In order to keep up with the demand in mobile data traffic, changes have to be made to system requirements to be able to meet these demands. Three critical areas that need to be enhanced in order to deliver this increase in traffic are larger bandwidth, lower latency, and higher data rates. One of the major limiting factors in wireless innovation is the availability in spectrum. To mitigate this, the unlicensed spectrum has been an area of interest to expand the availability of long-term evolution (LTE). In this context, one major enhancement for LTE in third generation partnership project (3GPP) Release 13 has been to enable its operation in the unlicensed spectrum via licensed-assisted access (LAA), which expands the system bandwidth by utilizing a flexible carrier aggregation (CA) framework introduced by the LTE-Advanced system. Now that the main building blocks for the framework of new radio (NR) have been established, a natural enhancement is to allow this framework to operate on an unlicensed spectrum as NR-U, especially with respect to enabling flexibility for configured grants in NR systems and to enhance UL transmissions.

DETAILED DESCRIPTION

Figure 1:
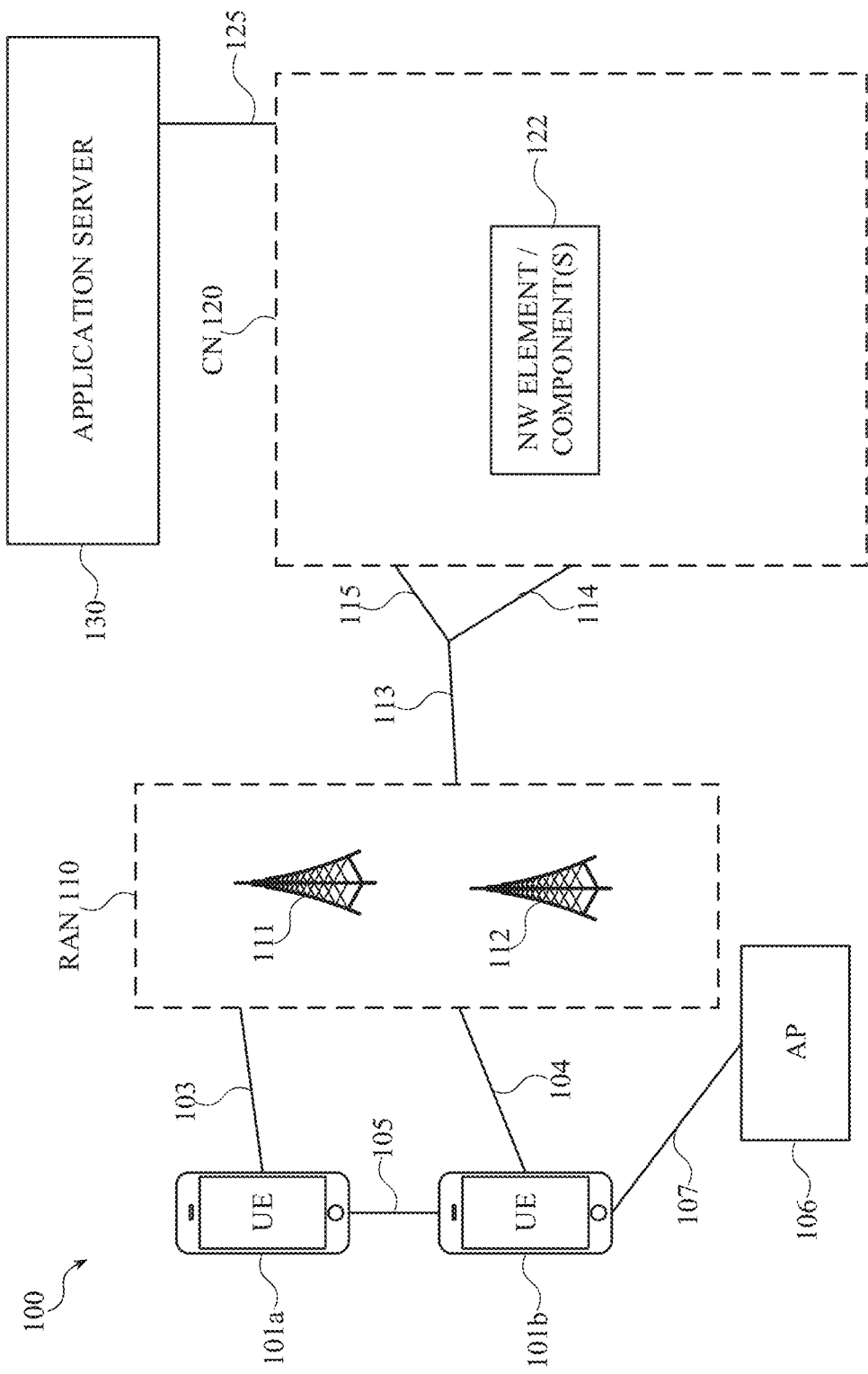
FIG. 1 is an exemplary block diagram illustrating an example of user equipment(s) (UEs) communicatively coupled a network with network components as peer devices useable in connection with various embodiments (aspects) described herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The present disclosure will now be described with reference to the attached drawing figures, wherein like reference numerals are used to refer to like elements throughout, and wherein the illustrated structures and devices are not necessarily drawn to scale. As utilized herein, terms "component," "system," "interface," and the like are intended to refer to a computer-related entity, hardware, software (e.g., in execution), and/or firmware. For example, a component can be a processor (e.g., a microprocessor, a controller, or other processing device), a process running on a processor, a controller, an object, an executable, a program, a storage device, a computer, a tablet PC and/or a user equipment (e.g., mobile phone, etc.) with a processing device. By way of illustration, an application running on a server and the server can also be a component. One or more components can reside within a process, and a component can be localized on one computer and/or distributed between two or more computers. A set of elements or a set of other components can be described herein, in which the term "set" can be interpreted as "one or more."

Further, these components can execute from various computer readable storage media having various data structures stored thereon such as with a module, for example. The components can communicate via local and/or remote processes such as in accordance with a signal having one or more data packets (e.g., data from one component interacting with another component in a local system, distributed system, and/or across a network, such as, the Internet, a local area network, a wide area network, or similar network with other systems via the signal).

As another example, a component can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components.

Use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form. Furthermore, to the extent that the terms "including", "includes", "having", "has", "with", or variants thereof are used in either the detailed description and the claims, such terms are intended to be inclusive in a manner similar to the term "comprising." Additionally, in situations wherein one or more numbered items are discussed (e.g., a "first X", a "second X", etc.), in general the one or more numbered items can be distinct or they can be the same, although in some situations the context can indicate that they are distinct or that they are the same.

As used herein, the term "circuitry" can refer to, be part of, or include an Application Specific Integrated Circuit (ASIC), an electronic circuit, a processor (shared, dedicated, or group), or associated memory (shared, dedicated, or group) operably coupled to the circuitry that execute one or more software or firmware programs, a combinational logic circuit, or other suitable hardware components that provide the described functionality. In some embodiments, the circuitry can be implemented in, or functions associated with the circuitry can be implemented by, one or more software or firmware modules. In some embodiments, circuitry can include logic, at least partially operable in hardware.

In consideration of various concerns for operating new radio (NR) 5G communications in both unlicensed as NR-U and licensed access to fairly coexist with different radio access technologies (RATs) (e.g., Wifi or another RAT) a number of issues related to uplink (UL) mechanisms can be overcome for power efficiency and flexibility in the UL transmission. A UE can process at least two sets of resource configurations comprising different sequence lengths for an uplink (UL) physical channel. The resources can be for communication according to different RATs or sharing resources therebetween. The UE can dynamically select a first sequence length or a second sequence length that is longer than the first sequence length from among the different sequence lengths of the at least two sets of resource configurations based on one or more conditions. The conditions can include at least one of: a UE capability, an occupied channel bandwidth (OCB), the UL transmission, or the UL physical channel. Different approaches can be configured for the different sequence lengths according to the condition(s).The UL physical channel comprises at least one of: a physical random access channel (PRACH), a physical uplink control channel (PUCCH), or a physical uplink shared channel (PUSCH), including one or more of: periodic, semi-persistent, or aperiodic transmission, for example. In particular, the first sequence length of the UL transmission can include a 139 indices or samples/symbols, and the second sequence length include at least one of: 1151 for a 15 kHz and 571 for 30 kHz, for example, for a physical random access channel (PRACH).

In other aspects, a gNB can configure or the UE can receive different sets of resource configurations for an uplink (UL) physical channel for an uplink (UL)-to-downlink (DL) channel occupancy time (COT) sharing to coexist with another radio access technology (RAT). An energy detection (ED) threshold can be selected by the UE from the different sets of resource configurations for an UL transmission based on one or more conditions. The UL transmission can then be provided based on the ED threshold, such as by indicating in ED indication feedback the selected ED or by deriving the COT based on the ED for a particular type of transmission (e.g., an ultra low latency transmission or other transmission). Additional aspects and details of the disclosure are further described below with reference to figures.

FIG. 1 illustrates an example architecture of a system 100 of a network, in accordance with various embodiments (aspects). The following description is provided for an example system 100 that operates in conjunction with the LTE system standards and 5G or NR system standards as provided by 3GPP technical specifications. However, the example embodiments are not limited in this regard and the described embodiments can apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 1, the system 100 includes UE 101a and UE 101b (collectively referred to as "UEs 101" or "UE 101"). In this example, UEs 101 are illustrated as smartphones (e.g., handheld touchscreen mobile computing devices connectable to one or more cellular networks), but can comprise any mobile or non-mobile computing device, such as consumer electronics devices, cellular phones, smartphones, feature phones, tablet computers, wearable computer devices, personal digital assistants (PDAs), pagers, wireless handsets, desktop computers, laptop computers, in-vehicle infotainment (IVI), in-car entertainment (ICE) devices, an Instrument Cluster (IC), head-up display (HUD) devices, onboard diagnostic (OBD) devices, dashtop mobile equipment (DME), mobile data terminals (MDTs), Electronic Engine Management System (EEMS), electronic/ engine control units (ECUs), electronic/engine control modules (ECMs), embedded systems, microcontrollers, control modules, engine management systems (EMS), networked or "smart" appliances, Machine Type Communication (MTC) devices, Machine to Machine (M2M), Internet of Things (IoT) devices, and/or the like.

In some embodiments, any of the UEs 101 can be IoT UEs, which can comprise a network access layer designed for low-power IoT applications utilizing short-lived UE connections. An IoT UE can utilize technologies such as M2M or MTC for exchanging data with an MTC server or device via a public land mobile network (PLMN), Proximity Services (ProSe) or Device-to-Device (D2D) communication, sensor networks, or IoT networks. The M2M or MTC exchange of data can be a machine-initiated exchange of data. An IoT network describes interconnecting IoT UEs, which can include uniquely identifiable embedded computing devices (within the Internet infrastructure), with short-lived connections. The IoT UEs can execute background applications (e.g., keep-alive messages, status updates, etc.) to facilitate the connections of the IoT network.

The UEs 101 can be configured to connect, for example, communicatively couple, with a Radio Access Network (RAN) 110. In embodiments, the RAN 110 can be an next generation (NG) RAN or a 5G RAN, an evolved-UMTS Terrestrial RAN (E-UTRAN), or a legacy RAN, such as a UTRAN or GERAN. As used herein, the term "NG RAN" or the like can refer to a RAN 110 that operates in an NR or 5G system 100, and the term "E-UTRAN" or the like can refer to a RAN 110 that operates in an LTE or 4G system 100. The UEs 101 utilize connections (or channels) 102 and 104, respectively, each of which comprises a physical communications interface/layer.

Alternatively, or additionally, each of the UEs 101 can be configured with dual connectivity (DC) as a multi-RAT or multi-Radio Dual Connectivity (MR-DC), where a multiple Rx/Tx capable UE may be configured to utilize resources provided by two different nodes (e.g., 111, 112, or other network nodes) that can be connected via non-ideal backhaul, one providing NR access and the other one providing either E-UTRA for LTE or NR access for 5G, for example. One node can act as a master node (MN) and the other as the secondary node (SN). The MN and SN can be connected via a network interface and at least the MN is connected to the core network 120. At least one of the MN or the SN can be operated with shared spectrum channel access. All functions specified for a UE can be used for an integrated access and backhaul mobile termination (IAB-MT). Similar for UE 101, the IAB-MT can access the network using either one network node or using two different nodes with EN-DC architectures, NR-DC architectures, or the like.

In this example, the connections 102 and 104 are illustrated as an air interface to enable communicative coupling, and can be consistent with cellular communications protocols, such as a Global System for Mobile communications (GSM) protocol, a Code-Division Multiple Access (CDMA) network protocol, a Push-to-Talk (PTT) protocol, a PTT over-cellular (POC) protocol, a Universal Mobile Telecommunications Service (UMTS) protocol, a 3GPP LTE protocol, a 5G protocol, a NR protocol, and/or any of the other communications protocols discussed herein. In embodiments, the UEs 101 can directly exchange communication data via a ProSe interface 105. The ProSe interface 105 can alternatively be referred to as a SL interface 105 and can comprise one or more logical channels, including but not limited to a physical sidelink control channel (PSCCH), a physical sidelink shared channel (PSSCH), a physical sidelink discovery channel (PSDCH), and a physical sidelink broadcast channel (PSBCH).

The UE 101b is shown to be configured to access an AP 106 (also referred to as "WLAN node 106," "WLAN 106," "WLAN Termination 106," "WT 106" or the like) via connection 107. The connection 107 can comprise a local wireless connection, such as a connection consistent with any IEEE 802.11 protocol, wherein the AP 106 would comprise a wireless fidelity (Wi-Fi®) router. In this example, the AP 106 is shown to be connected to the Internet without connecting to the core network of the wireless system (described in further detail below). In various embodiments, the UE 101b, RAN 110, and AP 106 can be configured to utilize LTE-WLAN aggregation (LWA) operation and/or LTE-WLAN Radio Level Integration with IPsec Tunnel (LWIP) operation. The LWA operation can involve the UE 101b in radio resource control RRC_CONNECTED being configured by a RAN node 111a-b to utilize radio resources of LTE and WLAN. LWIP operation can involve the UE 101b using WLAN radio resources (e.g., connection 107) via IPsec protocol tunneling to authenticate and encrypt packets (e.g., IP packets) sent over the connection 107. IPsec tunneling can include encapsulating the entirety of original IP packets and adding a new packet header, thereby protecting the original header of the IP packets.

The RAN 110 can include one or more access nodes (ANs) or RAN nodes 111a and 111b (collectively referred to as "RAN nodes 111" or "RAN node 111") that enable the connections 102 and 104. As used herein, the terms "access node," "access point," or the like can describe equipment that provides the radio baseband functions for data and/or voice connectivity between a network and one or more users. These access nodes can be referred to as BS, gNBs, RAN nodes, eNBs, NodeBs, RSUs, Transmission Reception Points (TRxPs) or TRPs, and so forth, and can comprise ground stations (e.g., terrestrial access points) or satellite stations providing coverage within a geographic area (e.g., a cell). As used herein, the term "NG RAN node" or the like can refer to a RAN node 111 that operates in an NR or 5G system 100 (for example, a gNB), and the term "E-UTRAN node" or the like can refer to a RAN node 111 that operates in an LTE or 4G system 100 (e.g., an eNB). According to various embodiments, the RAN nodes 111 can be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

In some embodiments, all or parts of the RAN nodes 111 can be implemented as one or more software entities running on server computers as part of a virtual network, which can be referred to as a centralized RAN (CRAN) and/or a virtual baseband unit pool (vBBUP). In these embodiments, the CRAN or vBBUP can implement a RAN function split, such as a Packet Data Convergence Protocol (PDCP) split wherein Radio Resource Control (RRC) and PDCP layers are operated by the CRAN/vBBUP and other L2 protocol entities are operated by individual RAN nodes 111; a Media Access Control (MAC)/Physical (PHY) layer split wherein RRC, PDCP, RLC, and MAC layers are operated by the CRAN/vBBUP and the PHY layer is operated by individual RAN nodes 111; or a "lower PHY" split wherein RRC, PDCP, RLC, MAC layers and upper portions of the PHY layer are operated by the CRAN/vBBUP and lower portions of the PHY layer are operated by individual RAN nodes 111. This virtualized framework allows the freed-up processor cores of the RAN nodes 111 to perform other virtualized applications. In some implementations, an individual RAN node 111 can represent individual gNB-Distributed Units (DUs) that are connected to a gNB-Control Unit (CU) via individual F1 interfaces. In these implementations, the gNB-DUs can include one or more remote radio heads or RF front end modules (RFEMs), and the gNB-CU can be operated by a server that is located in the RAN 110 (not shown) or by a server pool in a similar manner as the CRAN/vBBUP. Additionally or alternatively, one or more of the RAN nodes 111 can be next generation eNBs (ng-eNBs), which are RAN nodes that provide E-UTRA user plane and control plane protocol terminations toward the UEs 101, and are connected to a 5GC via an NG interface.

Any of the RAN nodes 111 can terminate the air interface protocol and can be the first point of contact for the UEs 101. In some embodiments, any of the RAN nodes 111 can fulfill various logical functions for the RAN 110 including, but not limited to, radio network controller (RNC) functions such as radio bearer management, uplink and downlink dynamic radio resource management and data packet scheduling, and mobility management.

In embodiments, the UEs 101 can be configured to communicate using Orthogonal Frequency-Division Multiplexing (OFDM) communication signals with each other or with any of the RAN nodes 111 over a multicarrier communication channel in accordance with various communication techniques, such as, but not limited to, an OFDMA communication technique (e.g., for downlink communications) or a Single Carrier Frequency-Division Multiple Access (SC-FDMA) communication technique (e.g., for uplink and ProSe or sidelink communications), although the scope of the embodiments (aspects) is not limited in this respect. The OFDM signals can comprise a plurality of orthogonal subcarriers.

In some embodiments, a downlink resource grid can be used for downlink transmissions from any of the RAN nodes 111 to the UEs 101, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this can represent the smallest quantity of resources that currently can be allocated. There are several different physical downlink channels that are conveyed using such resource blocks.

According to various embodiments, the UEs 101 and the RAN nodes 111 communicate data (for example, transmit and receive) data over a licensed medium (also referred to as the "licensed spectrum" and/or the "licensed band") and an unlicensed shared medium (also referred to as the "unlicensed spectrum" and/or the "unlicensed band"). The licensed spectrum can include channels that operate in the frequency range of approximately 400 MHz to approximately 2.8 GHz, whereas the unlicensed spectrum can include the 5 GHz band.

To operate in the unlicensed spectrum, the UEs 101 and the RAN nodes 111 can operate using Licensed Assisted Access (LAA), eLAA, and/or feLAA mechanisms. In these implementations, the UEs 101 and the RAN nodes 111 can perform one or more known medium-sensing operations and/or carrier-sensing operations in order to determine whether one or more channels in the unlicensed spectrum is unavailable or otherwise occupied prior to transmitting in the unlicensed spectrum. The medium/carrier sensing operations can be performed according to a listen-before-talk (LBT) protocol.

LBT is a mechanism whereby equipment (for example, UEs 101 RAN nodes 111, etc.) senses a medium (for example, a channel or carrier frequency) and transmits when the medium is sensed to be idle (or when a specific channel in the medium is sensed to be unoccupied). The medium sensing operation can include Clear Channel Assessment (CCA), which utilizes at least energy detection (ED) to determine the presence or absence of other signals on a channel in order to determine if a channel is occupied or clear. This LBT mechanism allows cellular/LAA networks to coexist with incumbent systems in the unlicensed spectrum and with other LAA networks. ED can include sensing RF energy across an intended transmission band for a period of time and comparing the sensed RF energy to a predefined or configured threshold.

Typically, the incumbent systems in the 5 GHz band are WLANs based on IEEE 802.11 technologies. WLAN employs a contention-based channel access mechanism, called CSMA/CA. Here, when a WLAN node (e.g., a mobile station (MS) such as UE 101, AP 106, or the like) intends to transmit, the WLAN node can first perform CCA before transmission. Additionally, a backoff mechanism is used to avoid collisions in situations where more than one WLAN node senses the channel as idle and transmits at the same time. The backoff mechanism can be a counter that is drawn randomly within the CWS, which is increased exponentially upon the occurrence of collision and reset to a minimum value when the transmission succeeds. The LBT mechanism designed for LAA is somewhat similar to the CSMA/CA of WLAN. In some implementations, the LBT procedure for downlink (DL) or uplink (UL) transmission bursts including physical downlink shared channel (PDSCH) or physical uplink shared channel (PUSCH) transmissions, respectively, can have an LAA contention window that is variable in length between X and Y extended CCA (ECCA) slots, where X and Y are minimum and maximum values for the contention window sizes (CWSs) for LAA. In one example, the minimum CWS for an LAA transmission can be 9 microseconds (ps); however, the size of the CWS and a maximum channel occupancy time (MOOT) (for example, a transmission burst) can be based on governmental regulatory requirements.

The LAA mechanisms are built upon carrier aggregation (CA) technologies of LTE-Advanced systems. In CA, each aggregated carrier is referred to as a component carrier (CC). In some cases, individual CCs can have a different bandwidth than other CCs. In time division duplex (TDD) systems, the number of CCs as well as the bandwidths of each CC can be the same for DL and UL. CA also comprises individual serving cells to provide individual CCs. The coverage of the serving cells can differ, for example, because CCs on different frequency bands will experience different pathloss. A primary service cell or PCell can provide a primary component carrier (PCC) for both UL and DL, and can handle radio resource control (RRC) and non-access stratum (NAS) related activities. The other serving cells are referred to as SCells, and each SCell can provide an individual secondary component carrier (SCC) for both UL and DL. The SCCs can be added and removed as required, while changing the PCC can require the UE 101 to undergo a handover. In LAA, eLAA, and feLAA, some or all of the SCells can operate in the unlicensed spectrum (referred to as "LAA SCells"), and the LAA SCells are assisted by a PCell operating in the licensed spectrum. When a UE is configured with more than one LAA SCell, the UE can receive UL grants on the configured LAA SCells indicating different PUSCH starting positions within a same subframe.

The PDSCH carries user data and higher-layer signaling to the UEs 101. The physical downlink control channel (PDCCH) carries information about the transport format and resource allocations related to the PDSCH channel, among other things. It can also inform the UEs 101 about the transport format, resource allocation, and Hybrid Automatic Repeat Request (HARQ) information related to the uplink shared channel. Typically, downlink scheduling (assigning control and shared channel resource blocks to the UE 101b within a cell) can be performed at any of the RAN nodes 111 based on channel quality information fed back from any of the UEs 101. The downlink resource assignment information can be sent on the PDCCH used for (e.g., assigned to) each of the UEs 101.

The PDCCH uses control channel elements (CCEs) to convey the control information. Before being mapped to resource elements, the PDCCH complex-valued symbols can first be organized into quadruplets, which can then be permuted using a sub-block interleaver for rate matching. Each PDCCH can be transmitted using one or more of these CCEs, where each CCE can correspond to nine sets of four physical resource elements known as REGs. Four Quadrature Phase Shift Keying (QPSK) symbols can be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments can use concepts for resource allocation for control channel information that are an extension of the above-described concepts. For example, some embodiments can utilize an extended (E)-PDCCH that uses PDSCH resources for control information transmission. The EPDCCH can be transmitted using one or more ECCEs. Similar to above, each ECCE can correspond to nine sets of four physical resource elements known as an EREGs. An ECCE can have other numbers of EREGs in some situations.

The RAN nodes 111 can be configured to communicate with one another via an interface. In embodiments where the system 100 is an LTE system, the interface can be an X2 interface. The X2 interface can be defined between two or more RAN nodes 111 (e.g., two or more eNBs and the like) that connect to evolved packet core (EPC) or core network 120, and/or between two eNBs connecting to EPC 120. In some implementations, the X2 interface can include an X2 user plane interface (X2-U) and an X2 control plane interface (X2-C). The X2-U can provide flow control mechanisms for user data packets transferred over the X2 interface, and can be used to communicate information about the delivery of user data between eNBs. For example, the X2-U can provide specific sequence number information for user data transferred from a master eNB (MeNB) to an secondary eNB (SeNB); information about successful in sequence delivery of PDCP packet data units (PDUs) to a UE 101 from an SeNB for user data; information of PDCP PDUs that were not delivered to a UE 101; information about a current minimum desired buffer size at the SeNB for transmitting to the UE user data; and the like. The X2-C can provide intra-LTE access mobility functionality, including context transfers from source to target eNBs, user plane transport control, etc.; load management functionality; as well as inter-cell interference coordination functionality.

In embodiments where the system 100 is a 5G or NR system, either with a coexisting RAT or not, the interface can be an Xn interface 112. The Xn interface is defined between two or more RAN nodes 111 (e.g., two or more gNBs and the like) that connect to 5GC 120, between a RAN node 111 (e.g., a gNB) connecting to 5GC 120 and an eNB, and/or between two eNBs connecting to 5GC 120. In some implementations, the Xn interface can include an Xn user plane (Xn-U) interface and an Xn control plane (Xn-C) interface. The Xn-U can provide non-guaranteed delivery of user plane PDUs and support/provide data forwarding and flow control functionality. The Xn-C can provide management and error handling functionality, functionality to manage the Xn-C interface; mobility support for UE 101 in a connected mode (e.g., CM-CONNECTED) including functionality to manage the UE mobility for connected mode between one or more RAN nodes 111. The mobility support can include context transfer from an old (source) serving RAN node 111 to new (target) serving RAN node 111; and control of user plane tunnels between old (source) serving RAN node 111 to new (target) serving RAN node 111. A protocol stack of the Xn-U can include a transport network layer built on Internet Protocol (IP) transport layer, and a GPRS Tunnelling Protocol for User Plane (GTP-U) layer on top of a User Datagram Protocol (UDP) and/or IP layer(s) to carry user plane PDUs. The Xn-C protocol stack can include an application layer signaling protocol (referred to as Xn Application Protocol (Xn-AP)) and a transport network layer that is built on Stream Control Transmission Protocol (SCTP). The SCTP can be on top of an IP layer, and can provide the guaranteed delivery of application layer messages. In the transport IP layer, point-to-point transmission is used to deliver the signaling PDUs. In other implementations, the Xn-U protocol stack and/or the Xn-C protocol stack can be same or similar to the user plane and/or control plane protocol stack(s) shown and described herein.

The RAN 110 is shown to be communicatively coupled to a core network—in this embodiment, core network (CN) 120. The CN 120 can comprise a plurality of network elements 122, which are configured to offer various data and telecommunications services to customers/subscribers (e.g., users of UEs 101) who are connected to the CN 120 via the RAN 110. The components of the CN 120 can be implemented in one physical node or separate physical nodes including components to read and execute instructions from a machine-readable or computer-readable medium (e.g., a non-transitory machine-readable storage medium). In some embodiments, NFV can be utilized to virtualize any or all of the above-described network node functions via executable instructions stored in one or more computer-readable storage mediums (described in further detail below). A logical instantiation of the CN 120 can be referred to as a network slice, and a logical instantiation of a portion of the CN 120 can be referred to as a network sub-slice. Network Function Virtualization (NFV) architectures and infrastructures can be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more Evolved Packet Core (EPC) components/functions.

Generally, the application server 130 can be an element offering applications that use IP bearer resources with the core network (e.g., Universal Mobile Telecommunications System Packet Services (UMTS PS) domain, LTE PS data services, etc.). The application server 130 can also be configured to support one or more communication services (e.g., VoIP sessions, PTT sessions, group communication sessions, social networking services, etc.) for the UEs 101 via the EPC 120.

In embodiments, the CN 120 can be a 5GC (referred to as "5GC 120" or the like), and the RAN 110 can be connected with the CN 120 via an NG interface 113. In embodiments, the NG interface 112 can be split into two parts, an Next Generation (NG) user plane (NG-U) interface 114, which carries traffic data between the RAN nodes 111 and a User Plane Function (UPF), and the S1 control plane (NG-C) interface 115, which is a signaling interface between the RAN nodes 111 and Access and Mobility Management Functions (AMFs). The Core network CN 120 can also be a 5GC 120.

In embodiments, the CN 120 can be a 5G CN (referred to as "5GC 120" or the like), while in other embodiments, the CN 120 can be an evolved packet core (EPC)). Where CN 120 is an EPC (referred to as "EPC 120" or the like), the RAN 110 can be connected with the CN 120 via an S1 interface 113. In embodiments, the S1 interface 113 can be split into two parts, an S1 user plane (S1-U) interface 114, which carries traffic data between the RAN nodes 111 and the S-GW, and the S1-MME interface 115, which is a signaling interface between the RAN nodes 111 and MMEs.

Figure 2:
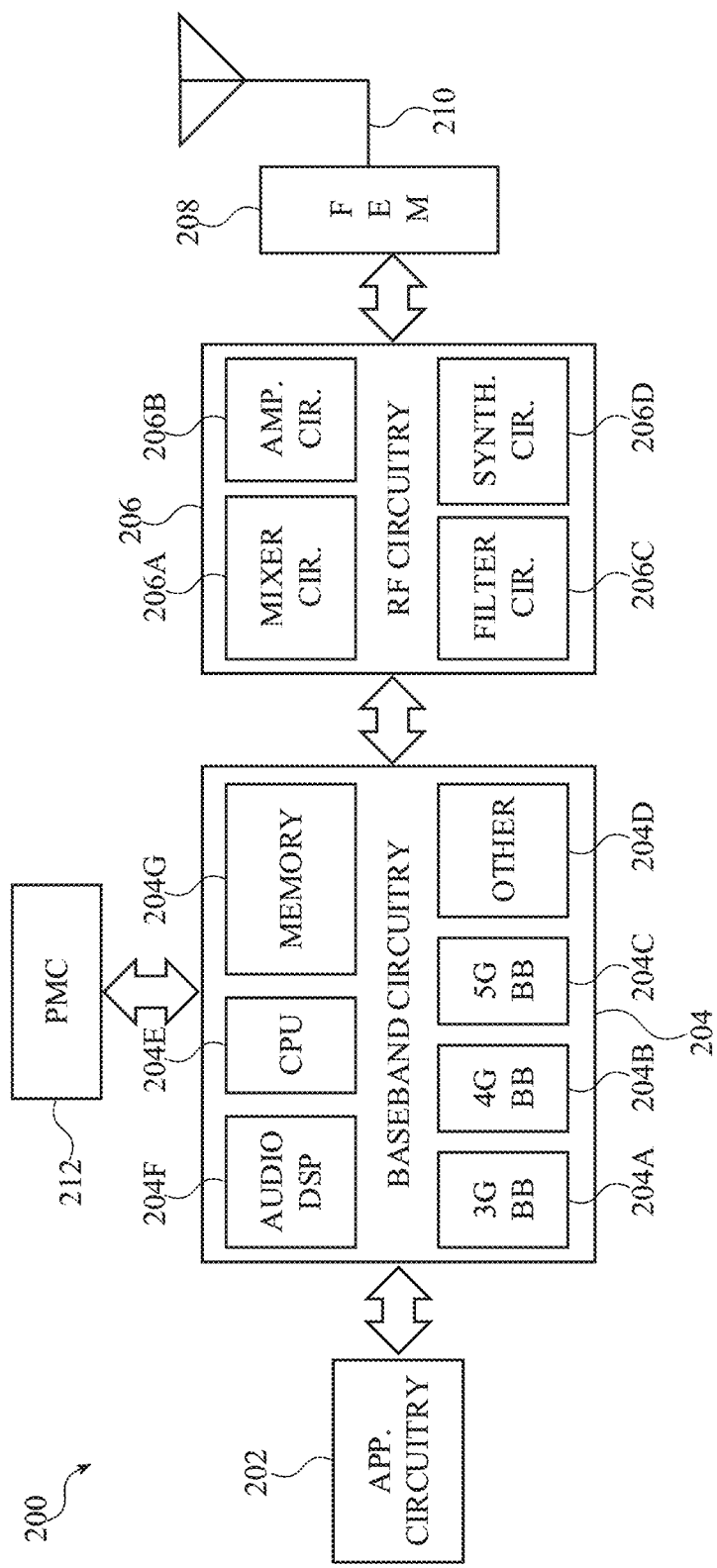
FIG. 2 is an example architecture of a system of a network, in accordance with various embodiments.

FIG. 2 illustrates example components of a device 200 in accordance with some embodiments. In some embodiments, the device 200 can include application circuitry 202, baseband circuitry 204, Radio Frequency (RF) circuitry 206, front-end module (FEM) circuitry 208, one or more antennas 210, and power management circuitry (PMC) 212 coupled together at least as shown. The components of the illustrated device 200 can be included in a UE or a RAN node, such as UE 101/102, or eNB/gNB 111/112. In some embodiments, the device 200 can include less elements (e.g., a RAN node can not utilize application circuitry 202, and instead include a processor/controller to process IP data received from an EPC). In some embodiments, the device 200 can include additional elements such as, for example, memory/storage, display, camera, sensor, or input/output (I/O) interface. In other embodiments, the components described below can be included in more than one device (e.g., said circuitries can be separately included in more than one device for Cloud-RAN (C-RAN) implementations).

The application circuitry 202 can include one or more application processors. For example, the application circuitry 202 can include circuitry such as, but not limited to, one or more single-core or multi-core processors. The processor(s) can include any combination of general-purpose processors and dedicated processors (e.g., graphics processors, application processors, etc.). The processors can be coupled with or can include memory/storage and can be configured to execute instructions stored in the memory/storage to enable various applications or operating systems to run on the device 200. In some embodiments, processors of application circuitry 202 can process IP data packets received from an EPC.

The baseband circuitry 204 can include circuitry such as, but not limited to, one or more single-core or multi-core processors. The baseband circuitry 204 can include one or more baseband processors or control logic to process baseband signals received from a receive signal path of the RF circuitry 206 and to generate baseband signals for a transmit signal path of the RF circuitry 206. Baseband processing circuitry 204 can interface with the application circuitry 202 for generation and processing of the baseband signals and for controlling operations of the RF circuitry 206. For example, in some embodiments, the baseband circuitry 204 can include a third generation (3G) baseband processor 204A, a fourth generation (4G) baseband processor 204B, a fifth generation (5G) baseband processor 204C, or other baseband processor(s) 204D for other existing generations, generations in development or to be developed in the future (e.g., second generation (2G), sixth generation (6G), etc.). The baseband circuitry 204 (e.g., one or more of baseband processors 204A-D) can handle various radio control functions that enable communication with one or more radio networks via the RF circuitry 206. In other embodiments, some or all of the functionality of baseband processors 204A-D can be included in modules stored in the memory 204G and executed via a Central Processing Unit (CPU) 204E. The radio control functions can include, but are not limited to, signal modulation/demodulation, encoding/decoding, radio frequency shifting, etc. In some embodiments, modulation/demodulation circuitry of the baseband circuitry 204 can include Fast-Fourier Transform (FFT), precoding, or constellation mapping/demapping functionality. In some embodiments, encoding/decoding circuitry of the baseband circuitry 204 can include convolution, tail-biting convolution, turbo, Viterbi, or Low Density Parity Check (LDPC) encoder/decoder functionality. Embodiments of modulation/demodulation and encoder/decoder functionality are not limited to these examples and can include other suitable functionality in other embodiments.

In addition, the memory 204G (as well as other memory components discussed herein, e.g., memory, data storage, or the like) can comprise one or more machine-readable medium/media including instructions that, when performed by a machine or component herein cause the machine to perform acts of the method or of an apparatus or system for concurrent communication using multiple communication technologies according to embodiments and examples described herein. It is to be understood that aspects described herein can be implemented by hardware, software, firmware, or any combination thereof. When implemented in software, functions can be stored on or transmitted over as one or more instructions or code on a computer-readable medium (e.g., the memory described herein or other storage device). Computer-readable media includes both computer storage media and communication media including any medium that facilitates transfer of a computer program from one place to another. A storage media or a computer readable storage device can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or other tangible and/or non-transitory medium, that can be used to carry or store desired information or executable instructions. Also, any connection can also be termed a computer-readable medium. For example, if software is transmitted from a website, server, or other remote source using a coaxial cable, fiber optic cable, twisted pair, digital subscriber line (DSL), or wireless technologies such as infrared, radio, and microwave, then coaxial cable, fiber optic cable, twisted pair, DSL, or wireless technologies such as infrared, radio, and microwave are included in the definition of medium.

In some embodiments, the baseband circuitry 204 can include one or more audio digital signal processor(s) (DSP) 204F. The audio DSP(s) 204F can be include elements for compression/decompression and echo cancellation and can include other suitable processing elements in other embodiments. Components of the baseband circuitry can be suitably combined in a single chip, a single chipset, or disposed on a same circuit board in some embodiments. In some embodiments, some or all of the constituent components of the baseband circuitry 204 and the application circuitry 202 can be implemented together such as, for example, on a system on a chip (SOC).

In some embodiments, the baseband circuitry 204 can provide for communication compatible with one or more radio technologies. For example, in some embodiments, the baseband circuitry 204 can support communication with an evolved universal terrestrial radio access network (EUTRAN) or other wireless metropolitan area networks (WMAN), a wireless local area network (WLAN), a wireless personal area network (WPAN). Embodiments in which the baseband circuitry 204 is configured to support radio communications of more than one wireless protocol can be referred to as multi-mode baseband circuitry.

RF circuitry 206 can enable communication with wireless networks using modulated electromagnetic radiation through a non-solid medium. In various embodiments, the RF circuitry 206 can include switches, filters, amplifiers, etc. to facilitate the communication with the wireless network. RF circuitry 206 can include a receive signal path which can include circuitry to down-convert RF signals received from the FEM circuitry 208 and provide baseband signals to the baseband circuitry 204. RF circuitry 206 can also include a transmit signal path which can include circuitry to up-convert baseband signals provided by the baseband circuitry 204 and provide RF output signals to the FEM circuitry 208 for transmission.

In some embodiments, the receive signal path of the RF circuitry 206 can include mixer circuitry 206a, amplifier circuitry 206b and filter circuitry 206c. In some embodiments, the transmit signal path of the RF circuitry 206 can include filter circuitry 206c and mixer circuitry 206a. RF circuitry 206 can also include synthesizer circuitry 206d for synthesizing a frequency for use by the mixer circuitry 206a of the receive signal path and the transmit signal path. In some embodiments, the mixer circuitry 206a of the receive signal path can be configured to down-convert RF signals received from the FEM circuitry 208 based on the synthesized frequency provided by synthesizer circuitry 206d. The amplifier circuitry 206b can be configured to amplify the down-converted signals and the filter circuitry 206c can be a low-pass filter (LPF) or band-pass filter (BPF) configured to remove unwanted signals from the down-converted signals to generate output baseband signals. Output baseband signals can be provided to the baseband circuitry 204 for further processing. In some embodiments, the output baseband signals can be zero-frequency baseband signals, although this is not a requirement. In some embodiments, mixer circuitry 206a of the receive signal path can comprise passive mixers, although the scope of the embodiments is not limited in this respect.

In some embodiments, the mixer circuitry 206a of the transmit signal path can be configured to up-convert input baseband signals based on the synthesized frequency provided by the synthesizer circuitry 206d to generate RF output signals for the FEM circuitry 208. The baseband signals can be provided by the baseband circuitry 204 and can be filtered by filter circuitry 206c.

In some embodiments, the mixer circuitry 206a of the receive signal path and the mixer circuitry 206a of the transmit signal path can include two or more mixers and can be arranged for quadrature downconversion and upconversion, respectively. In some embodiments, the mixer circuitry 206a of the receive signal path and the mixer circuitry 206a of the transmit signal path can include two or more mixers and can be arranged for image rejection (e.g., Hartley image rejection). In some embodiments, the mixer circuitry 206a of the receive signal path and the mixer circuitry 206a can be arranged for direct downconversion and direct upconversion, respectively. In some embodiments, the mixer circuitry 206a of the receive signal path and the mixer circuitry 206a of the transmit signal path can be configured for super-heterodyne operation.

In some embodiments, the output baseband signals and the input baseband signals can be analog baseband signals, although the scope of the embodiments is not limited in this respect. In some alternate embodiments, the output baseband signals and the input baseband signals can be digital baseband signals. In these alternate embodiments, the RF circuitry 206 can include analog-to-digital converter (ADC) and digital-to-analog converter (DAC) circuitry and the baseband circuitry 204 can include a digital baseband interface to communicate with the RF circuitry 206.

In some dual-mode embodiments, a separate radio IC circuitry can be provided for processing signals for each spectrum, although the scope of the embodiments is not limited in this respect.

In some embodiments, the synthesizer circuitry 206d can be a fractional-N synthesizer or a fractional N/N+1 synthesizer, although the scope of the embodiments is not limited in this respect as other types of frequency synthesizers can be suitable. For example, synthesizer circuitry 206d can be a delta-sigma synthesizer, a frequency multiplier, or a synthesizer comprising a phase-locked loop with a frequency divider.

The synthesizer circuitry 206d can be configured to synthesize an output frequency for use by the mixer circuitry 206a of the RF circuitry 206 based on a frequency input and a divider control input. In some embodiments, the synthesizer circuitry 206d can be a fractional N/N+1 synthesizer.

In some embodiments, frequency input can be provided by a voltage-controlled oscillator (VCO), although that is not a requirement. Divider control input can be provided by either the baseband circuitry 204 or the applications processor 202 depending on the desired output frequency. In some embodiments, a divider control input (e.g., N) can be determined from a look-up table based on a channel indicated by the applications processor 202.

Synthesizer circuitry 206d of the RF circuitry 206 can include a divider, a delay-locked loop (DLL), a multiplexer and a phase accumulator. In some embodiments, the divider can be a dual modulus divider (DMD) and the phase accumulator can be a digital phase accumulator (DPA). In some embodiments, the DMD can be configured to divide the input signal by either N or N+1 (e.g., based on a carry out) to provide a fractional division ratio. In some example embodiments, the DLL can include a set of cascaded, tunable, delay elements, a phase detector, a charge pump and a D-type flip-flop. In these embodiments, the delay elements can be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206*d* can be configured to generate a carrier frequency as the output frequency, while in other embodiments, the output frequency can be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency can be a LO frequency (fLO). In some embodiments, the RF circuitry 206 can include an IQ/polar converter.

FEM circuitry 208 can include a receive signal path which can include circuitry configured to operate on RF signals received from one or more antennas 210, amplify the received signals and provide the amplified versions of the received signals to the RF circuitry 206 for further processing. FEM circuitry 208 can also include a transmit signal path which can include circuitry configured to amplify signals for transmission provided by the RF circuitry 206 for transmission by one or more of the one or more antennas 210. In various embodiments, the amplification through the transmit or receive signal paths can be done solely in the RF circuitry 206, solely in the FEM 208, or in both the RF circuitry 206 and the FEM 208.

In some embodiments, the FEM circuitry 208 can include a TX/RX switch to switch between transmit mode and receive mode operation. The FEM circuitry can include a receive signal path and a transmit signal path. The receive signal path of the FEM circuitry can include an LNA to amplify received RF signals and provide the amplified received RF signals as an output (e.g., to the RF circuitry 206). The transmit signal path of the FEM circuitry 208 can include a power amplifier (PA) to amplify input RF signals (e.g., provided by RF circuitry 206), and one or more filters to generate RF signals for subsequent transmission (e.g., by one or more of the one or more antennas 210).

In some embodiments, the PMC 212 can manage power provided to the baseband circuitry 204. In particular, the PMC 212 can control power-source selection, voltage scaling, battery charging, or DC-to-DC conversion. The PMC 212 can often be included when the device 200 is capable of being powered by a battery, for example, when the device is included in a UE. The PMC 212 can increase the power conversion efficiency while providing desirable implementation size and heat dissipation characteristics.

While FIG. 2 illustrates the PMC 212 coupled only with the baseband circuitry 204. However, in other embodiments, the PMC 212 can be additionally or alternatively coupled with, and perform similar power management operations for, other components such as, but not limited to, application circuitry 202, RF circuitry 206, or FEM 208.

In some embodiments, the PMC 212 can control, or otherwise be part of, various power saving mechanisms of the device 200. For example, if the device 200 is in an RRC_Connected state, where it is still connected to the RAN node as it expects to receive traffic shortly, then it can enter a state known as Discontinuous Reception Mode (DRX) after a period of inactivity. During this state, the device 200 can power down for brief intervals of time and thus save power.

If there is no data traffic activity for an extended period of time, then the device 200 can transition off to an RRC_Idle state, where it disconnects from the network and does not perform operations such as channel quality feedback, handover, etc. The device 200 goes into a very low power state and it performs paging where again it periodically wakes up to listen to the network and then powers down again. The device 200 can not receive data in this state, in order to receive data, it transitions back to RRC_Connected state.

For low latency/low power operations, the device 200 can be configured to suspend/resume in 5G NR by utilizing the RRC_Inactive state, which can significantly reduce latency and minimize the battery consumption. In the suspend procedure, both the UE and the RAN store information about the UE transition from connected to inactive, along with the UE radio protocol configuration. The resume procedure optimizes the transition from inactive to connected by restoring the UE radio protocol configuration. RAN-based location management and RAN paging make it possible for UEs in the inactive state to move around in an area without notifying the network.

Processors of the application circuitry 202 and processors of the baseband circuitry 204 can be used to execute elements of one or more instances of a protocol stack. For example, processors of the baseband circuitry 204, alone or in combination, can be used to execute Layer 3, Layer 2, or Layer 1 functionality, while processors of the application circuitry 204 can utilize data (e.g., packet data) received from these layers and further execute Layer 4 functionality (e.g., transmission communication protocol (TCP) and user datagram protocol (UDP) layers). As referred to herein, Layer 3 can comprise a radio resource control (RRC) layer, described in further detail below. As referred to herein, Layer 2 can comprise a medium access control (MAC) layer, a radio link control (RLC) layer, and a packet data convergence protocol (PDCP) layer, described in further detail below. As referred to herein, Layer 1 can comprise a physical (PHY) layer of a UE/RAN node, described in further detail below.

Figure 3:
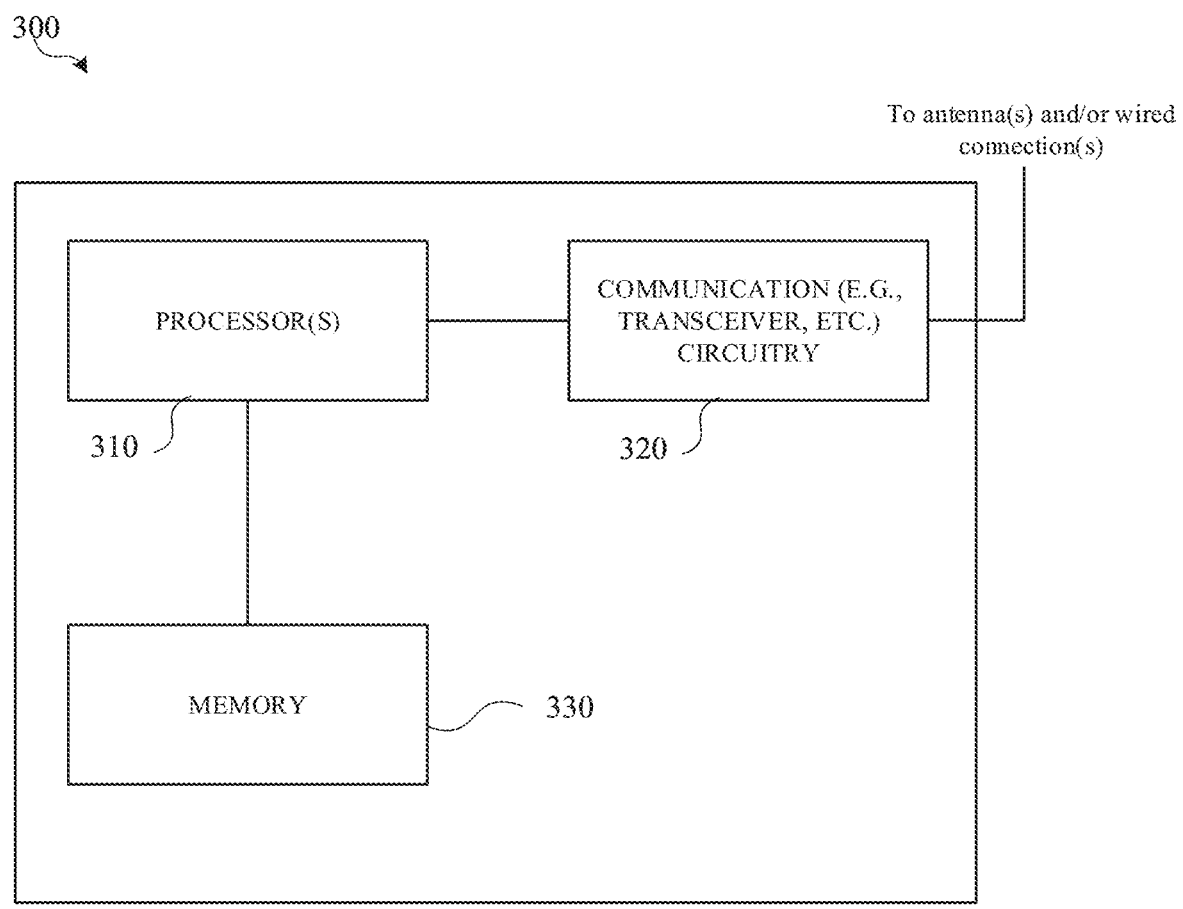
FIG. 3 is an exemplary a simplified block diagram of a user equipment (UE) wireless communication device or other network device/component (e.g., eNB, gNB) in accordance with various embodiments described.

Referring to FIG. 3, illustrated is a block diagram of a user equipment wireless communication device (UE) or other network device/component (e.g., gNB, eNB, or other participating network entity/component). The UE device 300 includes one or more processors 310 (e.g., one or more baseband processors) comprising processing circuitry and associated interface(s), transceiver circuitry 320 (e.g., comprising RF circuitry, which can comprise transmitter circuitry (e.g., associated with one or more transmit chains) and/or receiver circuitry (e.g., associated with one or more receive chains) that can employ common circuit elements, distinct circuit elements, or a combination thereof), and a memory 330 (which can comprise any of a variety of storage mediums and can store instructions and/or data associated with one or more of processor(s) 310 or transceiver circuitry 320).

In various embodiments (aspects) discussed herein, signals or messages can be generated and output for transmission, and/or transmitted messages can be received and processed. Depending on the type of signal or message generated, outputting for transmission (e.g., by processor(s) 310, processor(s) 310, etc.) can comprise one or more of the following: generating a set of associated bits that encode the content of the signal or message, coding (e.g., which can include adding a cyclic redundancy check (CRC) and/or coding via one or more of turbo code, low density parity-check (LDPC) code, tail-biting convolution code (TBCC), etc.), scrambling (e.g., based on a scrambling seed), modulating (e.g., via one of binary phase shift keying (BPSK), quadrature phase shift keying (QPSK), or some form of quadrature amplitude modulation (QAM), etc.), and/or resource mapping (e.g., to a scheduled set of resources, to a set of time and frequency resources granted for uplink transmission, etc.). Depending on the type of received signal or message, processing (e.g., by processor(s) 310) can comprise one or more of: identifying physical resources associated with the signal/message, detecting the signal/message, resource element group de-interleaving, demodulation, descrambling, and/or decoding.

According to various embodiments, to achieve various objectives on peak data rate, especially or NR-based access to unlicensed spectrum, and to unlock the increasingly important unlicensed spectrum (i.e. shared spectrum) for 5G NR system operation as one complementary source of spectrum various mechanism can be disclosed to enhance the UL transmission with coexisting RATs (e.g., WiFi and 5G or legacy). For unlicensed operation of NR system, a number of issues a identified with details in the following, which can cause performances loss from a system perspective.

For example, in a first issue, to fairly coexist with other RATs (e.g. Wifi), one of requirements include an occupied channel bandwidth (OCB) requirement, which defines that the occupied channel bandwidth, i.e., the bandwidth containing 99% of the power of the signal, being between 80% and 100% of a declared Nominal Channel Bandwidth. To fulfill this OCB requirement above, two longer sequences are introduced for Rel-16 NR-U operation, i.e. for 15 kHz SCS L_RA=1151 and for 30 kHz SCS L_RA=571. However, how to select between a longer and a legacy shorter sequence can remain to be decided. More especially, always using a longer sequence than a shorter sequence could unnecessarily increase the signaling overhead for some cases, e.g. in case of PRACH transmission being within a gNB-initiated COT where OCB is already guaranteed with gNB 111 scheduling by FDMed with other channels in coexisting RATs. As such, various aspects or embodied solutions herein can improve the UL resource efficiency by conditionally configuring the selecting of different lengths for UL transmissions.

In another example, as a second issue, NR-U can support a UL-to-DL COT sharing in order to enhance the system throughput performance when it coexists with an un-scheduled autonomous system such as Wi-Fi because it can avoid a double LBT requirement (e.g., a Cat 4 LBT) at the gNB side. In current NR-U design, when sharing a UE-initiated COT, an UL-to-DL COT sharing ED threshold can be configured by the gNB 111 if DL signals/channels (PDSCH, PDCCH, reference signals) to any other UEs is to be sent in the shared COT. However, forcing the UE 101 to use a specific ED threshold configured by the gNB 111 can greatly reduce the channel access probability of the UE 101. Here, the UE 101 could indicate to the gNB 111 a duration or a total duration of a COT and utilize a shorter duration, for example, with downlink data for the transmission to improve resource efficiency. If the UE wants to set the COT it sensing the channel based on an indicated ED threshold. A sharing threshold can be low, which means that the UE 101 loses flexibility to indicate that it does not want to stay in or on the COT with the gNB 111, for example, especially for latency sensitive traffic or transmissions for a channel that is easy to transmit for NR-U traffic. As such, embodiments enable being able to configure the UE 101 with the flexibility based on characteristics of the transmission package (e.g., latency, power, type, or the like) to determine whether to use the gNB initiated COT or not.

In another example, as a third issue, Rel-16 can support a two-step RACH procedure to reduce the initial access procedure latency. More specifically, one gap can be defined between PRACH transmission and an associated message transmission (e.g., Msg-A). This gap configuration design can feasible for licensed band but also causes a risk of Msg-A PUSCH transmission failure due to LBT operation requested for unlicensed band. This issue can also be addressed to improve the 2-steps RACH procedure efficiency for NR-U. For a two step RACH procedure the PRACH and PUSCH message is not transmitted simultaneously, which could be an issue for NR-U. Additionally, for NR-LTE a gap therebetween can cause a rift in trying to obtain the channel if the Wifi senses the channel in a middle or gap area, thereby losing a chance to transmit in the PRACH stage and potentially losing the resource. As such, the various embodiments, enable configuring the gap to reduce complexity and increase efficiency for the two-step RACH procedure.

According to various aspects, at least two sets of resources with different sequence lengths: length-X1 and Length-X2 (e.g., for Sounding Reference Signal (SRS), PRACH or PUCCH), which can be configured by higher layers for one UL channel and a given UE 101, for example. The first length X1 and the second length X2 can be selected based on one or more conditions (e.g., subject to UE capability, or other conditions such as a received indicator, package parameters, or the like). In one embodiment, the first sequence length X1 can be shorter than the second sequence length X2 in symbol indices, or other unit/numerology, for example. In one example, the first sequence length X1 can be a value of about 139 for a PRACH transmission or other UL channel. The second sequence length X2 can include one of a plurality of second sequences X2s from which the UE 101 could be configured to select, including a longer sequence length and a shorter second sequence length. The short valued second sequence length $X2_1$ can be a value of about 571 for 30 kilohertz (kHz), for example, and the long valued second sequence length $X2_2$ can be a value of about 1151 for 15 Khz for PRACH transmission or other UL transmission, for example.

In an aspect, for an Initial Access Procedure, one of two lengths can be signaled by means of System Information Block 1 (SIB1) depending on a presence or coexistence of another incumbent system on a same frequency (e.g. Wi-Fi) and a configured/indicated requirement to meet/satisfy an Occupied Channel Bandwidth (OCB). In other configured embodiments, the UE 101 can be provided with configurations for a given UL channel associated with sequence length X1 and X2 (X2 including one or more longer sequence lengths than X1). Different operations can be configured for the UE 101 to determine the sequence length for each UL transmission.

In one approach or operation, for example, configurations of different lengths i.e., X1/X2 can be used for any particular one or any type of UL channel (e.g. SRS/PUCCH/PRACH) transmission, including any one or more of: a periodic, a semi-persistent, or an aperiodic transmission. In one embodiment, different periods maybe configured for length X1 and length X2. More specifically, the second sequence length X2 as the longer sequence can be configured with a longer periodicity than the first sequence length X1 in order to share the resources with an initial access procedure. This can serve to reduce signaling overhead and maximize spectrum efficiency.

Additionally, or alternatively, the UE 101 can be configured to validate that a corresponding UL transmission (e.g., a PRACH/SRS/other UL channel) is within a gNB-initiated Channel Occupation Time (COT) to ensure an OCB requirement for any transmission, where the share transmission as the UL transmission is within the OCB for coexisting RATs. Then the UE 101 can opportunistically transmit the UL channel with configured short sequence if the transmission (e.g., a PRACH/SRS/other UL channel) is within the gNB initiated COT. If the gNB-initiated COT is not detected based a downlink control information (DCI) (e.g., a DCI Format 2_0 or other DCI format) of a PDCCH or other DL channel), or a presence of a dynamic scheduled synchronization signal block (SSB)/scheduled PDSCH/scheduled PUCCH transmission, then the UE 101 can be configured to either skip the length-X1 short sequence length transmission (s) or conditionally fallback to using a second length X2 sequence transmission for the UL transmission.

Figure 4:
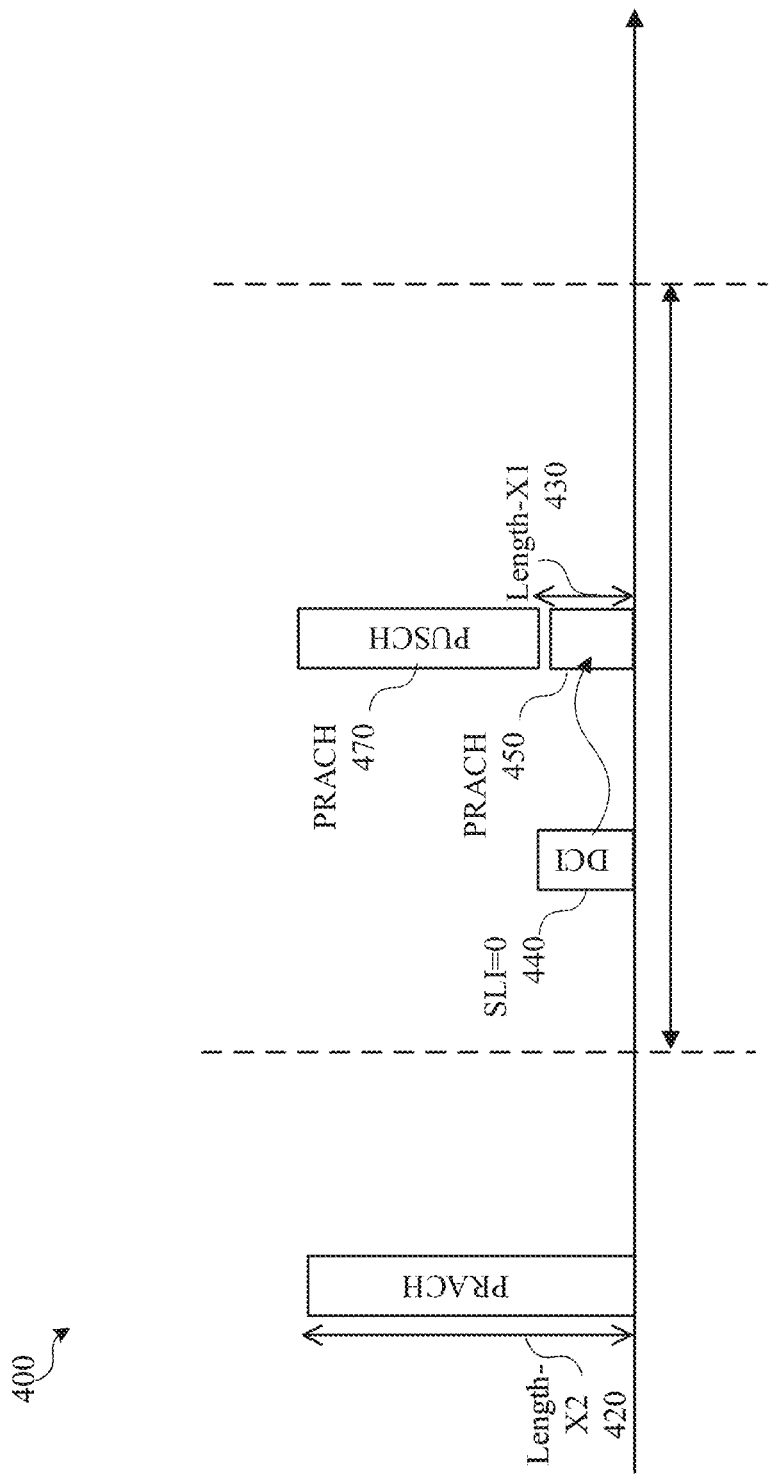
FIG. 4 is an illustration of an example sequence selection based on one or more conditions in accordance with various aspects described.

Referring to FIG. 4, illustrated is an example of sequence selection 400 depending on a gNB-initiated COT according to various aspects. A gNB initiated COT 410 can be implemented with configurations of different lengths (e.g., X1/X2) being used for any particular one UL channel (e.g. SRS/PUCCH/PRACH) transmission, including any one or more of: a periodic, a semi-persistent, or an aperiodic transmissions.

As suggested above, a certain length could be configured to be applied to both periodic and aperiodic transmission, and there not be any restriction with respect to what type or what kind of UL transmission that can be configured with sequence lengths X1/X2. If before the UL transmission, the transmission occasion or COT is already detected based on DCI format e.g. 2_0 or presence of a SSB or scheduled PDSCH, the UE 101 can perform a validation, especially with the shorter sequence length X1 430 in order to always ensure the OCB as predefined is established for the UE side. The UE 101 can only use short sequence if it already knows that the transmission is within the gNB initial COT and then opportunistically transmit the UL transmission with a configured short sequence to enable resource efficiency. If the gNB initiated COT is not detected, for example, based on the DCI format 2_0 or other DL channel, such as the Dynamic scheduled synchronization signal block (SSB)/scheduled PDSCH/scheduled PUCCH transmission the UE can skip the shorter X1 and use the X2 because there is some uncertainty that is within or outside the gNB initiated COT 410. From the UE perspective, this can be a band that the UE 101 receiver can simply skip at the transmission.

In another aspect, the UE 101 can conditionally fallback to the sequence length X2 420 such as when there is no detection based on a DCI format or other DL channel in the presence of SSB/scheduled PDSCH/scheduled PUCCH transmissions. The gNB 111 could detect through the hypothetical detection the length being used. Alternatively, the gNB 111 could already know the situation that the UE 101 failed to receive the COT for that transmission occasion even though originally configured with X1 with short sequence, and correspondingly assume that the UE 101 will fall back to the long sequence X2 420 without detection needed at the UE side.

In some cases, the UE can skip the length and also conditional fallback so there may be a mismatch between the UE 101 and gNB 111 regarding the COT duration, for example. The gNB 111 rarely transmits, and may not be detected at the UE side, resulting in a mismatch between UE 101 and gNB 111 in the resource that is being used for a particular UL signal transmission. As such, an object is to try to have an alignment between the UE 101 and gNB 111 regarding the sequence length.

In other aspects, a hybrid sequence can be configured with first sequence length X1 as length 430 and second longer sequence length-X2 as length 420, for example. In an aspect, the first sequence length X1 as 430 can be configured for aperiodic UL transmission only, which includes PRACH as well as SRS channels for RRC_CONNECTED mode UEs. In particular, the longer sequence length X2 420 can be without any restriction but consume more resource, as the longer sequence length X2 420 can generally always meet the OCB requirement regardless of being inside or outside the COT. The X1 length 430 may be only possible to be used in the COT due to shorter length, and thus, limited to aperiodic use and control by the DCI. In some embodiments, one Sequence Length Indictor (SLI) field can be added to a legacy DCI as DCI Format 1_0, DCI Format 1_1, or DCI Format 2_3, for example, to select one from among three lengths for a given UL transmission.

In one example, a bit width of SLI field can be one or zero. The value of '0' can indicate length-X1 430 sequence and the value of '1' can indicate length-X2 420 sequence, or vice versa the length X1 430 being indicated by '0' and the length X2 420 by '1'. As such, FIG. 4 illustrates one example of sequence length selection by leveraging the configurable SLI field in DCI Format 1_0, for example, that triggers the aperiodic PRACH transmission. DCI Format 1_0 can be configured to select sequence length between X1 and X2 (a plurality of different second sequence lengths) based on whether or not the PRACH transmission 450 420 occasion, is located within a COT 410 or outside of the COT 410. As shown, for example, the value of SLI field of the DCI 440 can be set to '0' in order to select length-X1 430 (i.e. short sequence length) for PRACH 450 transmission, which allows to schedule frequency division multiplexed (FDMed) PUSCH transmission 470 to improve the resource efficiency of COT 110. While the PRACH transmission of length 420 is outside the COT, the UE 101 can still use the long sequence X2 420 to meet an OCB requirement, for example.

The gNB 111 can control the transmission with DCI based on being periodic or not, where the periodic transmission could always use the X2 long sequence. The UE 101 can thus configure short and long sequence switching among the different lengths as only within the aperiodic transmission. For example, first the UE 101 can generate UL transmission with the longer X2 420, and then within the COT, the UE 101 can use short with the PUSCH transmission 470 (e.g., for channel state information (CSI) feedback). Here the SLI field can be used to explicitly indicate the length with short sequence 430.

Figure 5:
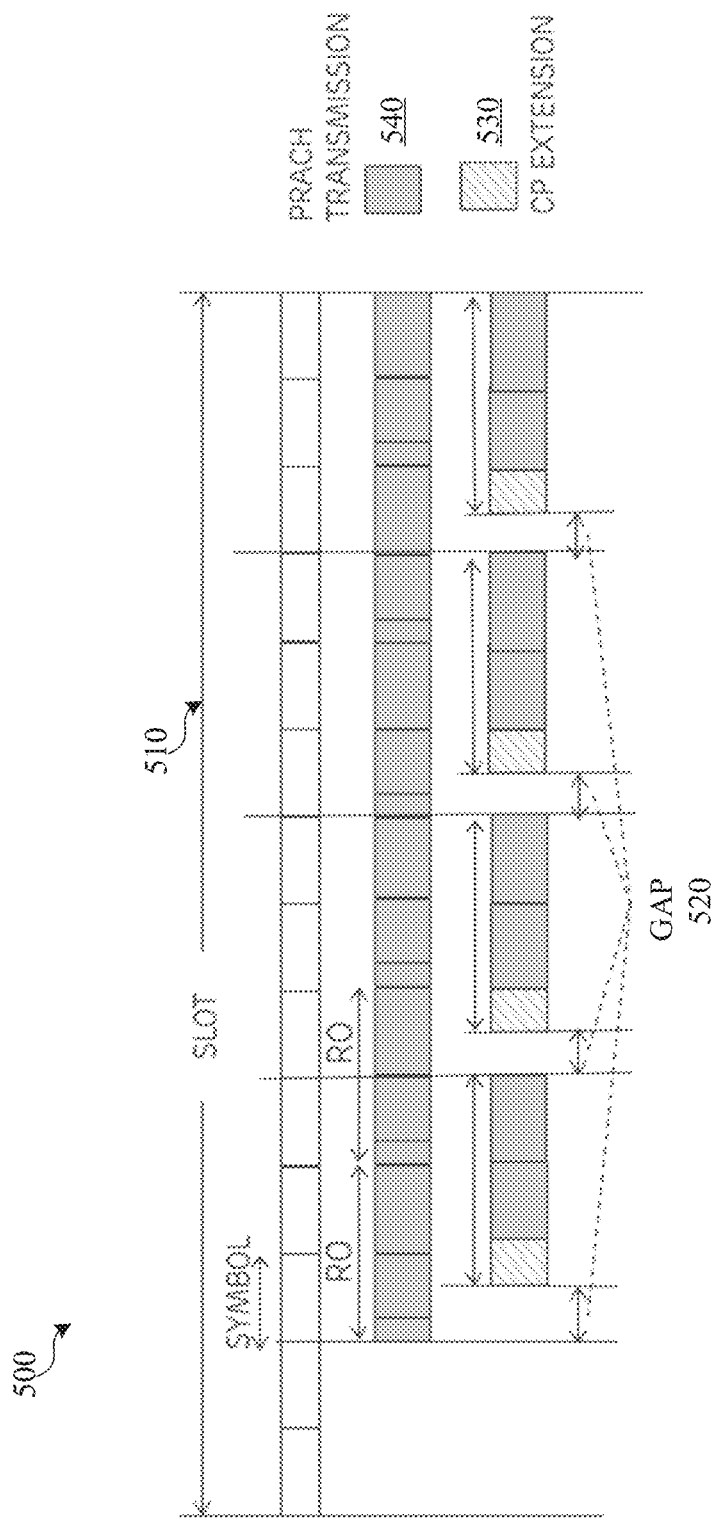
FIG. 5 is a block diagram of a Channel Occupancy Time dependent UL transmission in according to various embodiments herein.

Referring to FIG. 5, illustrated is an example of gap creation for COT dependent UL transmissions 500 in accordance with one or more aspects described. For NR-U transmission, an LBT procedure can be performed before commencing RACH transmission in order to avoid the collision and causing interference to on-going transmission with coexisting RATs. A Back-to-Back RACH Occasions (ROs) within a RACH slot 510 could cause PRACH transmission blockage. According to certain various aspects of this disclosure, a gap 520 can be created between two consecutive ROs within PRACH slot 510 by shifting 1-symbol later for transmission. In addition, cyclic prefix (CP) extension can be applied for the symbol preceding shifted RO is used to create the requested 16 microsecond (μs) or 20 μs/25 us gap. This maybe applied for PRACH within COT e.g. PRACH 450 in FIG. 4 or also applied for outside COT (e.g., the PRACH 420 of FIG. 4).

For example, a one symbol shift can be performed to a later symbol to obtain a first gap (e.g., 16 μs), and then a CP extension 530 be performed to generate the second gap (e.g., 20 μs or other) if it is required to do the LBT operation so it is within the gNB initiated COT. In this manger, the gap can be tuned for the PRACH transmission 540 by configuring a CP extension. The UE 101 thus varies the gap based on transmission conditions.

According to other aspects, the UE 101 can be configured to select between a signaled ED threshold value (Denoting ED1) and ED threshold 2 (ED2) as calculated based on a transmission power of a scheduled PUSCH. In one embodiment, the selection can utilize only when ED1 is less than ED2. The selection of an ED can enable the UE 101 to configure a UE initiated COT, for example, based on parameters of the packet or type of UL transmission or characteristics of UL transmission desired (e.g., a low latency, ultra-low latency transmission, urgency to transmit, or other characteristic). The selected ED threshold can be signaled to the gNB 111 depending on the PUSCH Type, such as a configured grant (CG) PUSH or a Dynamic(ally)-Granted PUSCH.

For example, if the PUSCH Type is a CG-PUSCH, the selected ED threshold for an UE-initiated COT (i.e., ED1 or ED2) based on the selected ED, this selected ED can be explicitly included/indicated in CG-UCI payload using 1-bit ED indictor field as ED feedback to the gNB 111. For example, the value of "0" can indicate ED1 and the value of "1" indicate ED2, or vice versa. In other aspects, a COT sharing table could be utilized by adding an additional row index that indicates "no COT sharing". The COT sharing table can be utilized with an indices or location provided in the UL transmission to the UE so as to indicate that a COT sharing is not to be enabled or not and allow a better potential or likelihood the UE obtains the channel specifically to the type of transmission or demands at the time. For example, the UE 101 can indicate the corresponding row index by using the existing COT sharing information element (IE) in a CG-UCI.

Alternatively, or additionally, the PUSCH Type can be a Dynamically-Granted (DG) PUSCH. In case of DG-PUSCH, the selected ED threshold value (e.g., ED1 or ED2) can be indicated by a dedicated ED Indictor (EDI) Uplink Control Information (UCI) IE in addition to HARQ-ACK and CSI-part 1/CSI-part 2. In case of collision with HARQ-ACK/CSI-part1/part 2, the EDI can be jointly encoded with HARQ-ACK using a same channel coding scheme. Alternatively, an RRC parameter can be introduced to allow gNB 111 to configure one of two of the following schemes for EDI UCI feedback. First, the UE 101 can operate to skip the EDI feedback if the total number of UCIs on the DG-PUSCH exceeds three; otherwise, the UE 101 can configure joint-encoding EDI with other UCI feedback. Additionally, or alternatively, the UE 101 can be configured to joint encode EDI with HARQ-ACK information bits and then piggyback or combine the encoded bits on the DG-PUSCH, for example.

Figure 6:
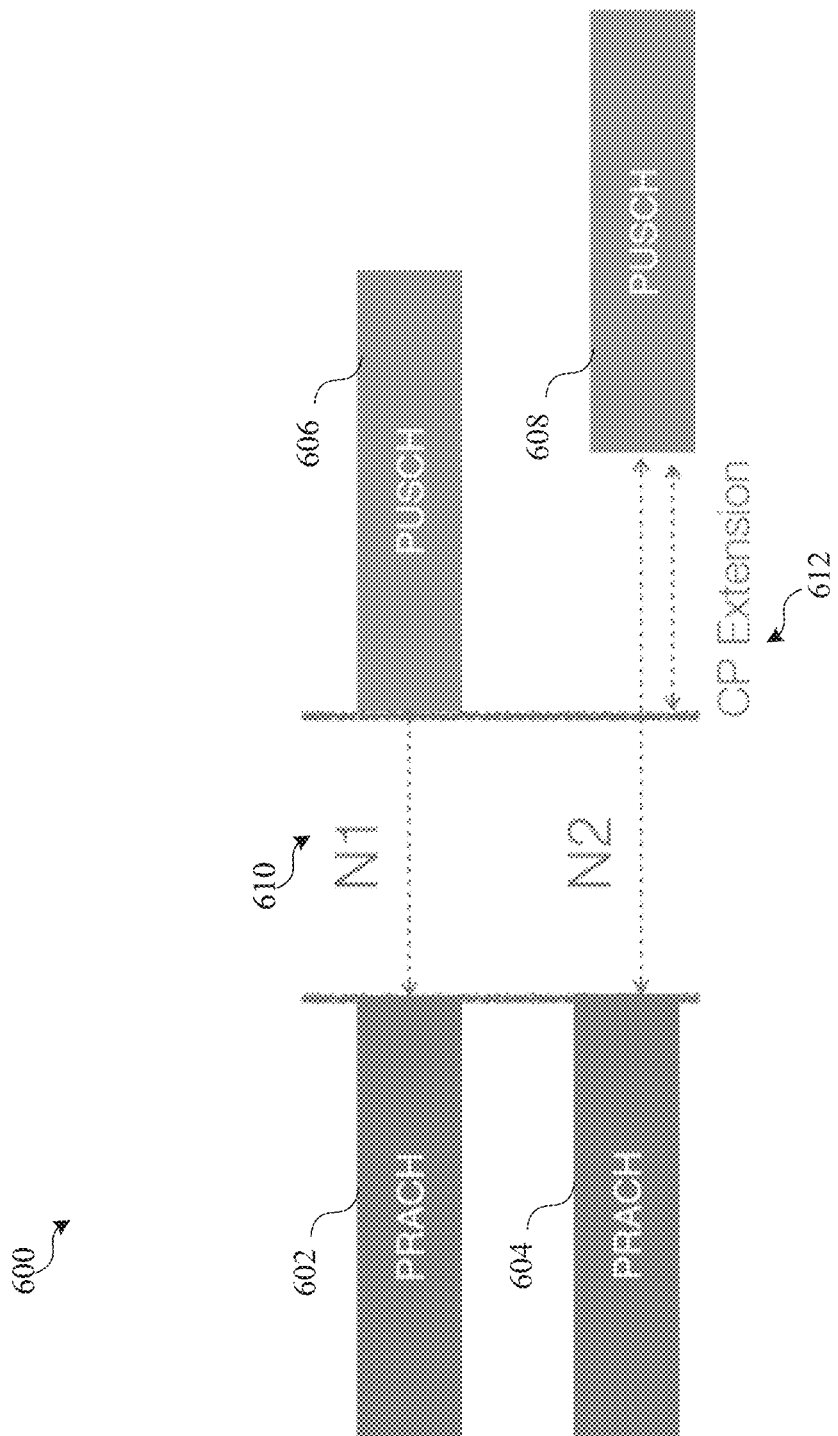
FIG. 6 is a block diagram of a conditional gap determination for UL transmission in according to various embodiments herein.

Referring to FIG. 6, illustrated is an example of a conditional gap 600 determination in accord with various aspects. Here, an example illustrates different occasions for UL transmission with PRACH, or any other UL transmission channel or type, in which different gaps 610 and 612 can be generated when the resource channel is being shared therebetween. For UL transmission, for example, the UE 101 can be configured to configure a gap as a conditional/variable gap between PRACH transmission 602, 604 and a PUSCH transmission 606, 608 based on a configuration between these PRACH 602, 604 and PUSCH 606, 608 transmissions. If there is a same numerology and have overlapped resources between PRACH and PUSCH for sharing of the COT, then certain restrictions or configurations (e.g., a same numerology, reception time, or other parameter) can be enabled for the gNB 111 to be able to leverage the bandwidth with a high probability of both UL transmission(s) being successful.

For example, if the UE 101 only does on LBT to transmit both UL transmissions resources (e.g., PRACH and PUSCH, or other paired UL transmissions), the UE 101 can generate a condition gap N1 at 610 or conditional gap 612 between the PRACH 602 and the PUSCH 606. The gap N1 at 610 can include zero or one symbols, for example. If zero, there is no gap necessarily, and with one or more symbols there can be different conditional gap lengths. The conditional gap N1 at 610 is shorter than the conditional gap N2 at 612.

In one example, the UE 101 can configure the conditional gap N2 value at 612 by reusing the values agreed for licensed band. In particular, the gap N1 value can used in case of a same numerology and overlapped frequency resources between PRACH and PUSCH of Msg A. Subsequently, a CP extension can be configured to achieve N1 symbols gap and DCI Format to switch between N1 and N2 symbols gap e.g. for PDCCH-ordered PRACH.

The UE 101 can have a certain reception time by adjusting the clock or some other baseband components when the smaller gap value 610 may not reasonable or feasible. If the UE 101 configures a band in UL transmission requiring the gap N2 value or to configure a different numerology, then the UE 101 can generate a CP extension expanding the gap to the N2 value so it can have the whole package to handle this issue. A CP extension can thus essentially support configurations without a gap or with smaller gap Ni gap 610.

While the methods described within this disclosure are illustrated in and described herein as a series of acts or events, it will be appreciated that the illustrated ordering of such acts or events are not to be interpreted in a limiting sense. For example, some acts can occur in different orders and/or concurrently with other acts or events apart from those illustrated and/or described herein. In addition, not all illustrated acts can be required to implement one or more aspects or embodiments of the description herein. Further, one or more of the acts depicted herein can be carried out in one or more separate acts and/or phases. Reference can be made to the figures described above for ease of description. However, the methods are not limited to any particular embodiment/aspect or example provided within this disclosure and can be applied to any of the systems disclosed herein.

Figure 7:
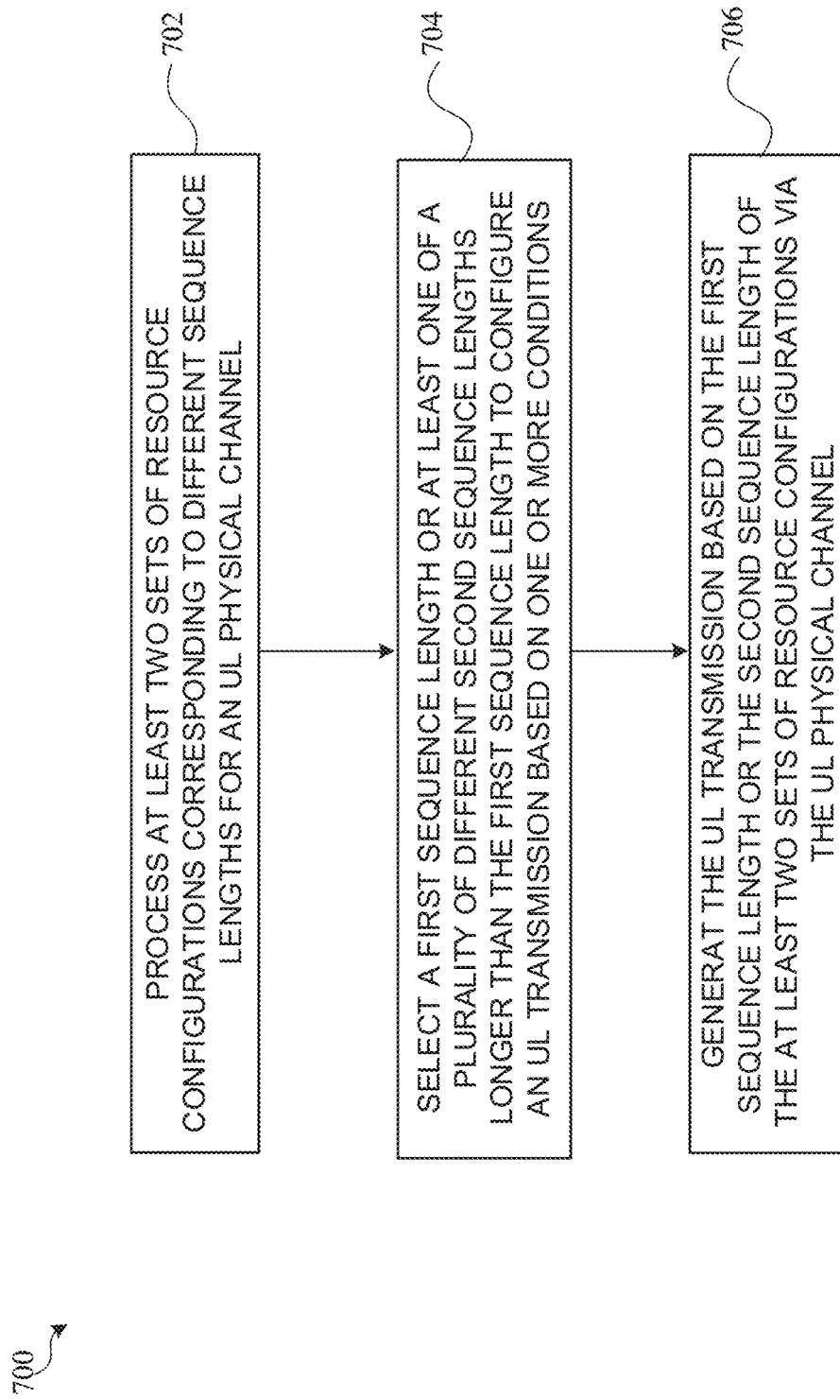
FIG. 7 is another block diagram illustrating an example process flow according to various embodiments described herein.

Referring to FIG. 7, illustrated is an example process flow 700 for a network device or component (e.g., UE 101, base station 110, AP 106 or other network component) to perform UL transmission with different sequence lengths. At 702, the process flow includes processing at least two sets of resource configurations corresponding to different sequence lengths for an UL physical channel. At 704, the process flow includes selecting a first sequence length or at least one of a plurality of different second sequence lengths longer than the first sequence length to configure an UL transmission based on one or more conditions. At 706, the process flow includes generating the UL transmission based on the first sequence length or the second sequence length of the at least two sets of resource configurations via the UL physical channel.

In other aspects, the process flow 700 can include processing an indication of the first sequence length, or the at least one of the different second sequence lengths. The plurality of second sequence lengths can include a shorter sequence length of a first frequency and a longer sequence length of a second greater frequency than the first frequency. The indication can include a system information block 1

(SIB1) based on an OCB requirement for an initial access procedure and coexisting with another RAT.

Figure 8:
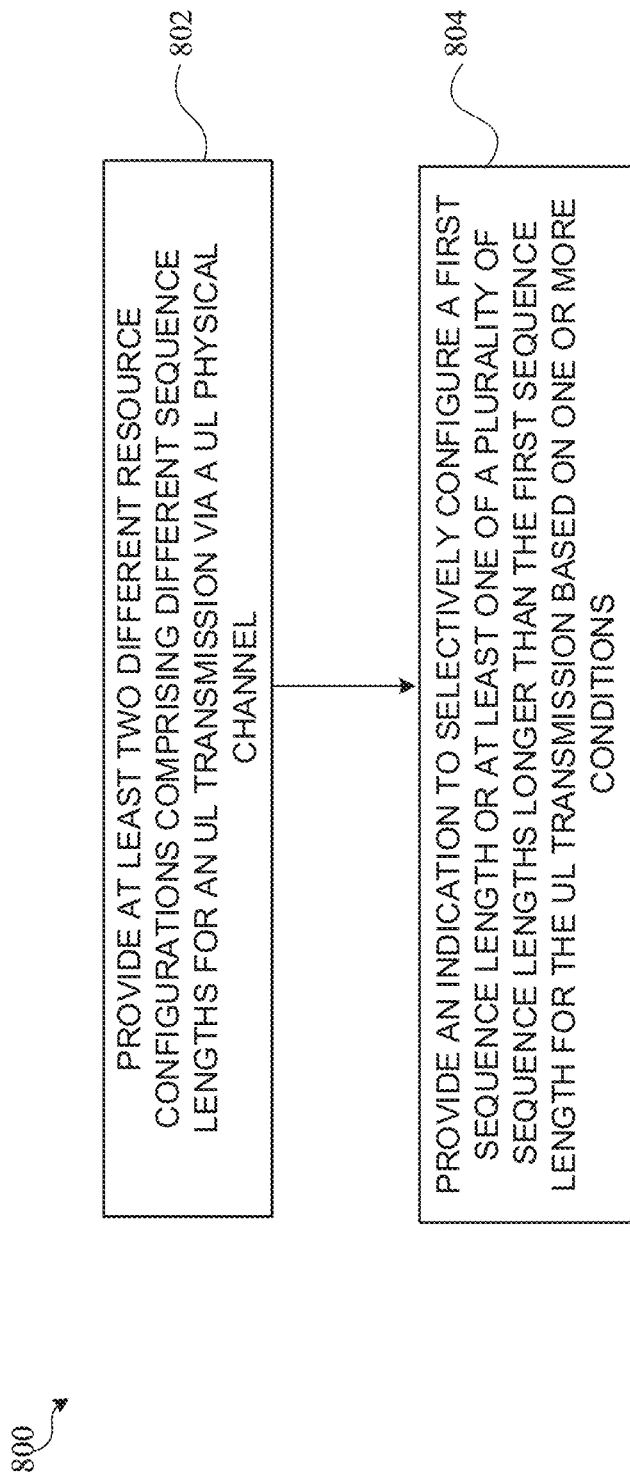
FIG. 8 is another block diagram illustrating an example process flow according to various embodiments described herein

Referring to FIG. 8, illustrated is an example process flow 800 for a network device or component (e.g., UE 101, base station 110, AP 106 or other network component) to enable dynamic selection of sequence lengths for UL transmissions. The process flow initiates at 802 with providing at least two different resource configurations comprising different sequence lengths for an UL transmission via a ul physical channel. At 804, the process includes providing an indication to selectively configure a first sequence length or at least one of a plurality of sequence lengths longer than the first sequence length for the ul transmission based on one or more conditions.

In an aspect, the process flow can further include providing a system information block (SIB 1) to indicate the first sequence length or the at least one of the plurality of sequence lengths, based on at least one of: a coexisting radio access technology (RAT) on a same frequency as the UL transmission, an occupied channel bandwidth (OCB), or an initial access procedure. A gNB initiated channel occupancy time (COT) can be provided in a DL channel to initiate the first sequence length for the UL transmission. Alternatively, or additionally, a sequence length indicator (SLI) field indicator can be provided to a DCI format that selects from one of three lengths of the first sequence length, a shorter length of the plurality of sequence lengths, or a longer length of the plurality of sequence lengths.

Figure 9:
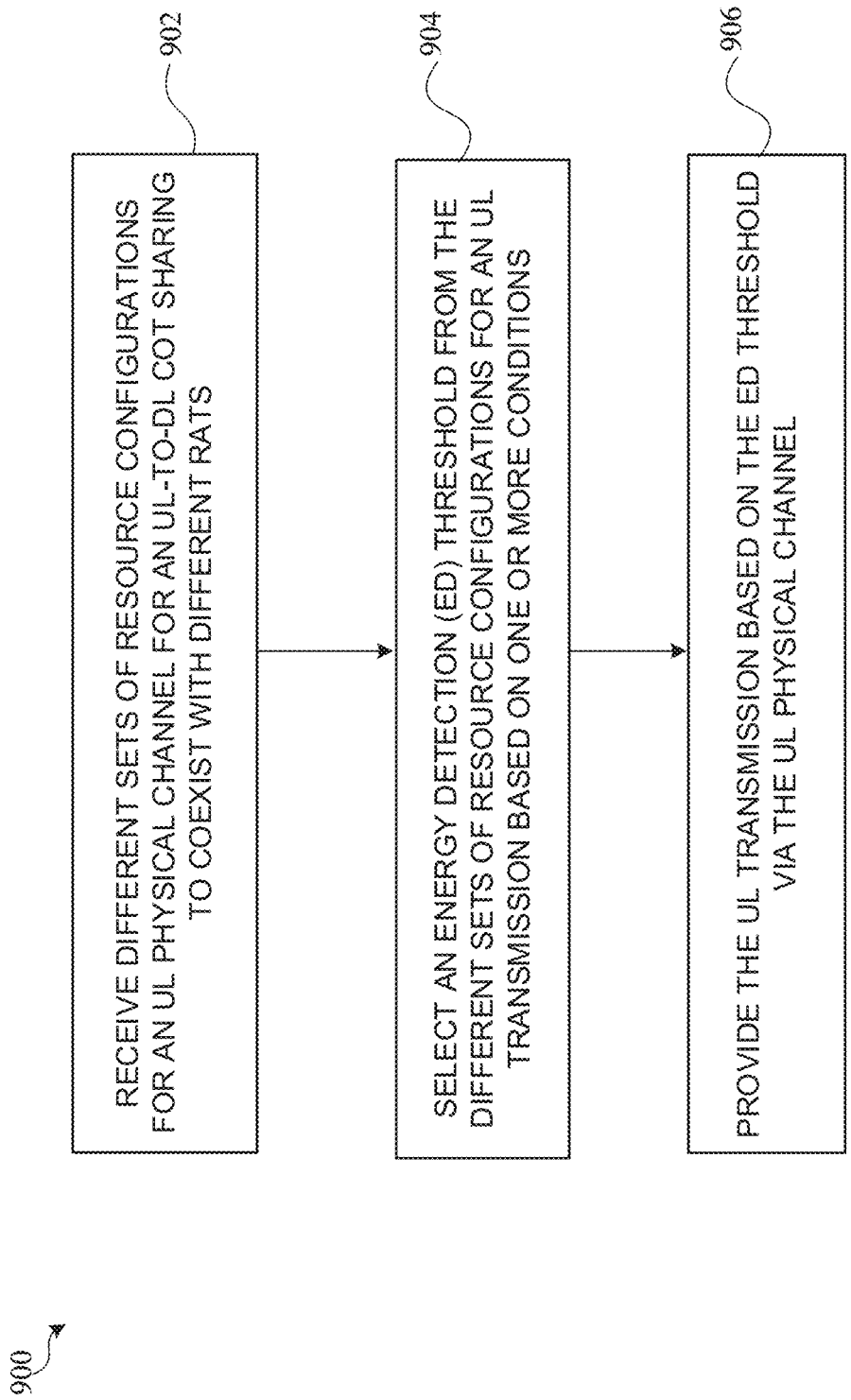
FIG. 9 is another block diagram illustrating an example process flow according to various embodiments described herein.

Referring to FIG. 9, illustrated is an example process flow 900 for a network device or component (e.g., UE 101, base station 110, AP 106 or other network component) to perform UL transmissions. The process flow 900 initiates at 902 with receiving different sets of resource configurations for an UL physical channel for an UL-to-DL COT sharing to coexist with different RATs. At 904, the process flow 900 includes selecting an energy detection (ED) threshold from the different sets of resource configurations for an ul transmission based on one or more conditions. At 906, the process flow 900 includes providing the ul transmission based on the ed threshold via the ul physical channel.

In an aspect, the one or more conditions associated with selecting the ED threshold includes a level of latency for the UL transmission, a first ED threshold and a second ED threshold that is greater than the first ED threshold. The ED threshold that is selected is derived from a transmission power of a scheduled physical uplink shared channel (PUSCH) for the UL transmission.

The process flow 900 can further include signaling the ED threshold as a selected ED threshold that is selected from among a plurality of ED thresholds based on a PUSCH Type. In response to the PUSCH Type comprising a configured grant (CG) PUSCH, the process flow 900 includes signaling a CG uplink control information (CG-UCI) or signaling a setting an indicator of a channel occupancy time (COT) table in a row index based on a COT sharing information element (IE) of the CG-UCI, to indicate the selected ED threshold. In response to the PUSCH Type comprising a Dynamically-Granted (DG) PUSCH, the process flow 900 includes signaling a dedicated ED Indicator (EDI) uplink control information (EDI-UCI) information element (IE).

In other aspects, the process flow 900 can include jointly encoding the EDI-UCI with a hybrid automatic repeat request (HARQ) acknowledgment (ACK) with a same coding scheme to avoid a collision with a HARQ-ACK/channel state information (CSI)-part 1/CSI-part 2. Alternatively, or additionally, the EDI feedback can be skipped in response to a total number of UCIs on a DG-PUSCH exceeding a predefined threshold.

Figure 10:
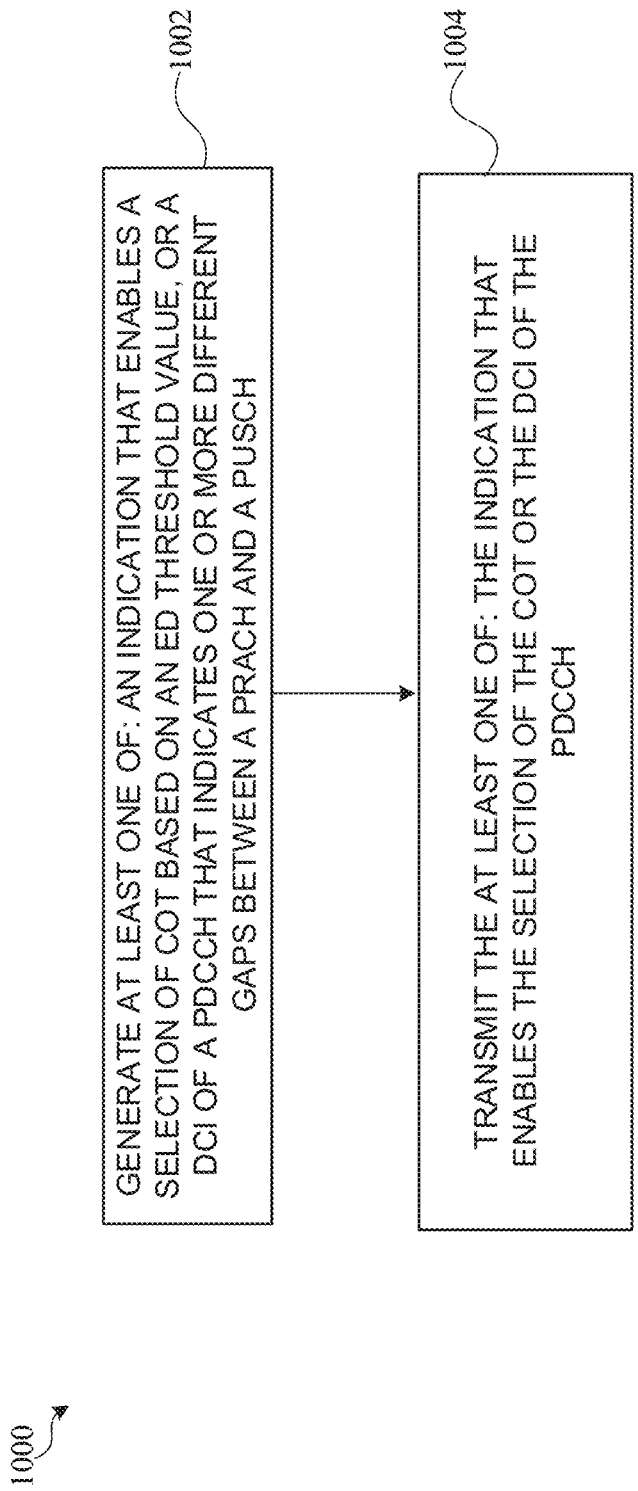
FIG. 10 is another block diagram illustrating an example process flow according to various embodiments described herein

Referring to FIG. 10, illustrated is an example process flow 1000 for a network device or component (e.g., UE 101, base station 110, AP 106 or other network component) to enable dynamic UL transmissions at a UE. The process flow 1000 initiates at 1002 with generating at least one of: an indication that enables a selection of COT based on an ED threshold value, or a DCI of a PDCCH that indicates one or more different gaps between a PRACH and a PUSCH. At 1004, the process flow 1000 includes transmitting the at least one of: the indication that enables the selection of the COT or the DCI of the PDCCH.

In aspect, the process flow can include processing the selection of the ED threshold based on a PUSCH Type comprising configured grant (CG) PUSCH or Dynamically-Granted (DG) PUSCH. Alternatively, or additionally, the process flow 1000 can include processing the PRACH and the PUSCH with a gap derived from a cyclic prefix (CP) extension.

As it is employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor can also be implemented as a combination of computing processing units.

Examples (embodiments) can include subject matter such as a method, means for performing acts or blocks of the method, at least one machine-readable medium including instructions that, when performed by a machine (e.g., a processor with memory, an application-specific integrated circuit (ASIC), a field programmable gate array (FPGA), or the like) cause the machine to perform acts of the method or of an apparatus or system for concurrent communication using multiple communication technologies according to embodiments and examples described herein.

A first example is an apparatus employed in a user equipment (UE), comprising: processing circuitry configured to: receive at least two sets of resource configurations including different sequence lengths for an uplink (UL) physical channel; select a first sequence length or a second sequence length that is longer than the first sequence length from among the different sequence lengths of the at least two sets of resource configurations based on one or more conditions; and generate an uplink (UL) transmission based on the selected first sequence length or the second sequence length of the at least two sets of resource configurations via the UL physical channel. A radio frequency (RF) interface is configured to provide, to RF circuitry, data for a transmission of the UL transmission.

A second example can include the first example, wherein the one or more conditions include at least one of: a UE capability, an occupied channel bandwidth (OCB), the UL transmission, or the UL physical channel, and wherein the UL physical channel includes at least one of: a physical random access channel (PRACH), a physical uplink control channel (PUCCH), or a physical uplink shared channel (PUSCH).

A third example can include the first or second example, wherein the at least two sets of resource configurations are associated with a PRACH transmission, and the second sequence length includes one of at least two different subcarrier spacing (SCS) sequence lengths associated with different frequency spacings greater than the first sequence length, respectively, for the PRACH transmission.

A fourth example can include any one or more of the first through third examples, wherein the processing circuitry is further configured to process, in response to reception of the at least two sets of resource configurations, a system information block (SIB) that includes an indication of the one of the at least two different SCS sequence lengths, and determine the one of the two different subcarrier spacing (SCS) sequence lengths for generating the UL transmission based on the indication of the SIB.

A fifth example can include any one or more of the first through fourth examples, wherein the processing circuitry is further configured to generate the UL transmission based on the second sequence length for an initial access procedure based on a coexisting radio access technology (RAT) and an occupied channel bandwidth (OCB) configured for the UL transmission.

A sixth example can include any one or more of the first through fifth examples, wherein the processing circuitry is further configured to generate different periods for the first sequence length and the second sequence length, wherein a periodicity of the second sequence length corresponds with an initial access procedure to share one or more resources with the UL transmission.

A seventh example can include any one or more of the first through sixth examples, wherein the processing circuitry is further configured to determine that the UL transmission for a PRACH or sounding reference signal (SRS) is within a gNodeB (gNB) initiated channel occupation time (COT), and in response to being within the gNB initiated COT, transmit the UL transmission based on the first sequence length.

An eighth example can include any one or more of the first through seventh examples, wherein the processing circuitry is further configured to skip the first sequence length for the UL transmission or fallback to generating the UL transmission based on the second sequence length, in response to a gNB initiated COT being undetected at a downlink control information (DCI) format 2_0 or a downlink (DL) channel.

A ninth example can include any one or more of the first through eighth examples, wherein the processing circuitry is further configured to: generate a hybrid sequence based on the first sequence length and the second sequence length in an aperiodic UL transmission comprising the UL transmission; and determine a sequence length based on a sequence length indicator (SLI) field of a DCI.

A tenth example can include any one or more of the first through ninth examples, wherein the processing circuitry is further configured to generate a gap between two consecutive RACH occasions (ROs) by shifting at least one symbol later in the UL transmission.

An eleventh example can include any one or more of the first through tenth examples, wherein the processing circuitry is further configured to generate the gap as a first gap between the at least two consecutive ROs in response to the UL transmission as a PRACH being within a gNB initiated COT, and additionally generate a CP extensions to increase the gap in response to the PRACH being outside the gNB initiated COT.

A twelfth example can be a tangible computer readable storage device storing executable instructions that, in response to execution, cause one or more processors of a network component comprising a user equipment (UE) to perform operations, the operations comprising: processing at least two sets of resource configurations corresponding to different sequence lengths for an uplink (UL) physical channel; selecting a first sequence length or at least one of a plurality of different second sequence lengths longer than the first sequence length to configure an UL transmission based on one or more conditions; and generating the UL transmission based on the first sequence length or the second sequence length of the at least two sets of resource configurations via the UL physical channel.

A thirteenth example can include the twelfth example, the operations further comprising: processing an indication of the first sequence length, or the at least one of the plurality of different second sequence lengths, wherein the plurality of second sequence lengths includes a shorter sequence length of a first frequency and a longer sequence length of a second greater frequency than the first frequency.

A fourteenth example can include any one or more of the twelfth through the thirteenth examples, wherein the indication includes a system information block 1 (SIB1) based on an occupied channel bandwidth (OCB) requirement for an initial access procedure and coexisting with another radio access technology (RAT).

A fifteenth example can include any one or more of the twelfth through the fourteenth examples, wherein the shorter sequence length of the plurality of different second sequence lengths includes a first frequency and the longer sequence length of the plurality of different sequence lengths includes a second frequency greater than the first frequency.

A sixteenth example can include any one or more of the twelfth through the fifteenth examples, the operations further comprising: configuring different lengths of the UL transmission for at least one of: a physical random access channel (PRACH), a sounding reference signal (SRS), a physical uplink control channel (PUCCH), a periodic transmission, a semi-persistent transmission, or an aperiodic transmission.

A seventeenth example can include any one or more of the twelfth through the sixteenth examples, the operations further comprising: skipping the first sequence length or utilizing a second sequence length transmission, based on a gNodeB (gNB) initiated channel occupancy time (COT) not being detected in a downlink (DL) channel, the DL channel comprising at least one of: a dynamic scheduled synchronization signal block (SSB), a scheduled physical downlink shared channel (PDSCH), or a scheduled physical uplink control channel (PUCCH).

An eighteenth example can be a tangible computer readable storage device storing executable instructions that, in response to execution, cause one or more processors of a network device comprising an access point or a next generation NodeB (gNB) to perform operations, the operations comprising: providing at least two different resource configurations comprising different sequence lengths for an uplink (UL) transmission via a UL physical channel; and providing an indication to selectively configure a first sequence length or at least one of a plurality of sequence lengths longer than the first sequence length for the UL transmission based on one or more conditions.

A nineteenth example can include the eighteenth example, the operations further comprising: providing a system information block (SIB 1) to indicate the first sequence length or the at least one of the plurality of sequence lengths, based on at least one of: a coexisting radio access technology (RAT) on a same frequency as the UL transmission, an occupied channel bandwidth (OCB), or an initial access procedure.

A twentieth example includes any one or more of the eighteenth through nineteenth examples, the operations further comprising: providing a gNB initiated channel occupancy time (COT) in a DL channel to initiate the first sequence length for the UL transmission; or providing a sequence length indicator (SLI) field indicator to a DCI format that selects from one of three lengths of the first sequence length, a shorter length of the plurality of sequence lengths, or a longer length of the plurality of sequence lengths.

A twenty-first example can be an apparatus employed in a user equipment (UE), comprising: processing circuitry configured to: receive different sets of resource configurations for an uplink (UL) physical channel for an uplink (UL)-to-downlink (DL) channel occupancy time (COT) sharing to coexist with another radio access technology (RAT); select an energy detection (ED) threshold from the different sets of resource configurations for an UL transmission based on one or more conditions; and providing the UL transmission based on the ED threshold via the UL physical channel. A radio frequency (RF) interface is configured to provide, to RF circuitry, data for the UL transmission.

A twenty-second example can include the twenty-first example, wherein the processing circuitry is further configured to determine an energy detection (ED) threshold value based on at least one of: a transmission power of a scheduled PUSCH or a PUSCH type.

A twenty-third example can include any one of the twenty-first through twenty-second examples, wherein the processing circuitry is further configured to: select the ED threshold value based on an indicator field of a configured grant (CG) uplink control information (CG-UCI) for a CG-PUSCH or a dedicated ED Indicator (EDI) uplink control information (EDI-UCI) information element (IE) for a Dynamically-Granted (DG) PUSCH.

A twenty-fourth example can include any one of the twenty-first through twenty-third examples, wherein the processing circuitry is further configured to: select an energy detection (ED) threshold value based on a PUSCH type by signaling the ED threshold value based on a dedicated ED Indicator (EDI) uplink control information (EDI-UCI) information element (IE) for a Dynamically-Granted (DG) PUSCH.

A twenty-fifth example can include any one of the twenty-first through twenty-fourth examples, wherein the processing circuitry is further configured to: jointly encode the EDI-UCI with a hybrid automatic repeat request (HARQ) acknowledgment (ACK) with a same coding scheme in response to a collision being identified with a HARQ-ACK/channel state information (CSI)-part 1/CSI-part 2.

A twenty-sixth example can include any one of the twenty-first through twenty-fifth examples, wherein the processing circuitry is further configured to process a radio resource control (RRC) parameter that enable a gNodeB (gNB) to configure an EDI UCI feedback by skipping the EDI feedback in response to a total number of UCIs on a DG-PUSCH exceeding a predefined threshold, or jointly encoding the EDI feedback with other UCI feedback comprising HARQ-ACK information on a DG-PUSCH.

A twenty-seventh example can include any one of the twenty-first through twenty-sixth examples, wherein the processing circuitry is further configured to configure a gap between a PRACH transmission and a PUSCH transmission based on a first number of symbols or a second number of symbols that is greater than the first number of symbols.

A twenty-eighth example can include any one of the twenty-first through twenty-seventh examples, wherein the first number of symbols is utilized in response to a same numerology and an overlapped frequency resource between the PRACH transmission and a Message A (Msg_A) of the PUSCH transmission.

A twenty-ninth example can include any one of the twenty-first through twenty-eighth examples, wherein the processing circuitry is further configured to configure a gap between a PRACH transmission and a PUSCH transmission by switching between a first number of symbols and a second number of symbols that is greater than the first number of symbols for the PRACH transmission based on a DCI of a physical downlink control channel (PDCCH).

A thirtieth example can include any one of the twenty-first through twenty-ninth examples, wherein the gap is generated according to the first number of symbols based on a cyclic prefix (CP) extension.

A thirty-first example can be a tangible computer readable storage device storing executable instructions that, in response to execution, cause one or more processors of a network component comprising a user equipment (UE) to perform operations, the operations comprising: receiving different sets of resource configurations for an uplink (UL) physical channel for an uplink (UL)-to-downlink (DL) channel occupancy time (COT) sharing to coexist with different radio access technologies (RATs); selecting an energy detection (ED) threshold from the different sets of resource configurations for an UL transmission based on one or more conditions; and providing the UL transmission based on the ED threshold via the UL physical channel.

A thirty-second example can include any one of the thirtieth through thirty-first examples, wherein the one or more conditions associated with selecting the ED threshold includes a level of latency for the UL transmission, a first ED threshold and a second ED threshold that is greater than the first ED threshold, and wherein the ED threshold that is selected is derived from a transmission power of a scheduled physical uplink shared channel (PUSCH) for the UL transmission.

A thirty-third example can include any one of the thirtieth through thirty-second examples, the operations further comprising: signaling the ED threshold as a selected ED threshold that is selected from among a plurality of ED thresholds based on a PUSCH Type.

A thirty-fourth example can include any one of the thirtieth through thirty-third examples, the operations further comprising: in response to the PUSCH Type comprising a configured grant (CG) PUSCH, signaling a CG uplink control information (CG-UCI) or signaling a setting an indicator of a channel occupancy time (COT) table in a row index based on a COT sharing information element (IE) of the CG-UCI, to indicate the selected ED threshold.

A thirty-fifth example can include any one of the thirtieth through thirty-fourth examples, the operations further comprising: in response to the PUSCH Type comprising a Dynamically-Granted (DG) PUSCH, signaling a dedicated ED Indicator (EDI) uplink control information (EDI-UCI) information element (IE).

A thirty-sixth example can include any one of the thirtieth through thirty-fifth examples, the operations further comprising: jointly encoding the EDI-UCI with a hybrid automatic repeat request (HARQ) acknowledgment (ACK) with a same coding scheme to avoid a collision with a HARQ-ACK/channel state information (CSI)-part 1/CSI-part 2; or skipping EDI feedback in response to a total number of UCIs on a DG-PUSCH exceeding a predefined threshold.

A thirty-seventh example can include any one of the thirtieth through thirty-sixth examples, the operations further comprising: configuring a gap between a physical random access control channel (PRACH) transmission and a PUSCH transmission based on one of at least a first value associated with a numerology between the PRACH and the PUSCH and a second value greater than the first value, wherein the first value is utilized in response to a same numerology and an overlapped frequency resource between the PRACH transmission and a Message A (Msg_A) of the PUSCH transmission.

A thirty-eighth example can include any one of the thirtieth through thirty-seventh examples, the operations further comprising: generating a cyclic prefix (CP) extension to derive the first value and switch between the first value and the second value for the PRACH transmission based on a downlink control information (DCI) of a physical downlink control channel (PDCCH).

A thirty-ninth example can be a tangible computer readable storage device storing executable instructions that, in response to execution, cause one or more processors of a network device comprising an access point or a next generation NodeB (gNB) to perform operations, the operations comprising: generating at least one of: an indication that enables a selection of a channel occupancy time (COT) based on an energy detection (ED) threshold value, or a downlink control information (DCI) of a physical downlink control channel (PDCCH) that indicates one or more different gaps between a physical random access channel (PRACH) and a physical uplink shared control channel (PUSCH); and transmitting the at least one of: the indication that enables the selection of the COT or the DCI of the PDCCH.

A fortieth example can include the thirty-ninth example, the operations further comprising: processing the selection of the ED threshold based on a PUSCH Type comprising configured grant (CG) PUSCH or Dynamically-Granted (DG) PUSCH; or processing the PRACH and the PUSCH with a gap derived from a cyclic prefix (CP) extension.

A forty-first example can include an apparatus comprising means to perform one or more elements of a method described in or related to any of first thru twenty-first examples, or any other method or process described herein.

A forty-second example can include one or more non-transitory computer-readable media comprising instructions to cause an electronic device, upon execution of the instructions by one or more processors of the electronic device, to perform one or more elements of a method described in or related to any one of the first thru twenty-first examples, or any other method or process described herein.

A forty-third example can include an apparatus comprising logic, modules, or circuitry to perform one or more elements of a method described in or related to any one of the first thru twenty-first examples, or any other method or process described herein.

A forty-fourth example can include a method, technique, or process as described in or related any one of the first thru twenty-first examples, or portions or parts thereof.

A forty-fifth example can include an apparatus comprising: one or more processors and one or more computer-readable media comprising instructions that, when executed by the one or more processors, cause the one or more processors to perform the method, techniques, or process as described in or related to any one of the first thru twenty-first examples, or portions thereof.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the processes and/or actions of a method or algorithm can reside as one or any combination or set of codes and/or instructions on a machine-readable medium and/or computer readable medium, which can be incorporated into a computer program product.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

In particular regard to the various functions performed by the above described components (assemblies, devices, circuits, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the disclosure. In addition, while a particular feature can have been disclosed with respect to only one of several implementations, such feature can be combined with one or more other features of the other implementations as can be desired and advantageous for any given or particular application.

What is claimed is:

1. Baseband circuitry, comprising:
   processing circuitry configured to:
   receive system information comprising a first random access (RA) preamble length and a second RA preamble length, the first RA preamble length and the second RA preamble length being configured based on shared spectrum channel access;
   generate a physical RA channel (PRACH) message comprising a RA preamble according to the second RA preamble length;
   send the PRACH message to an interface with radio interface (RF) circuitry; and
   generate configured grant (CG) uplink control information (UCI) (CG-UCI) comprising an indication of no channel occupancy time (COT) sharing,
   wherein the CG-UCI is generated for a CG physical uplink shared channel (PUSCH), the CG-UCI corresponds to a UE-initiated COT, and the indication of the no COT sharing corresponds to an index associated with a row of a COT sharing table.

2. The baseband circuitry of claim 1, wherein the second RA preamble length is longer than the first RA preamble length.

3. The baseband circuitry of claim 2, wherein:
   the first RA preamble length is 139; and
   the second RA preamble length is 571.

4. The baseband circuitry of claim 2, wherein:
   the first RA preamble length is 139; and
   the second RA preamble length is 1151.

5. The baseband circuitry of claim 1, wherein the shared spectrum channel access corresponds to an unlicensed spectrum.

6. The baseband circuitry of claim 5, wherein the shared spectrum channel access comprises frequency resources of a 5 gigahertz (GHz) band.

7. The baseband circuitry of claim 1, wherein the first RA preamble length and the second RA preamble length are further configured based on an occupied channel bandwidth (OCB) of a physical uplink channel of an unlicensed spectrum.

8. The baseband circuitry of claim 7, wherein the OCB comprises a number of resource blocks (RBs) of a physical RA channel (PRACH).

9. The baseband circuitry of claim 7, wherein the physical uplink channel comprises a physical uplink shared channel (PUSCH).

10. The baseband circuitry of claim 1, wherein the first RA preamble length corresponds to a first number of orthogonal frequency-division multiplexing (OFDM) symbols that is less a second number of OFDM symbols that corresponds to the second RA preamble length.

11. The baseband circuitry of claim 1, wherein the system information comprises a system information block configured to indicate the first RA preamble length and the second RA preamble length.

12. The baseband circuitry of claim 1, wherein the CG-UCI is jointly encoded with a hybrid automatic repeat request (HARQ) acknowledgment (ACK) for a PUSCH.

13. The baseband circuitry of claim 1, wherein the system information comprises an indication of a sub-carrier spacing for the first RA preamble length and one of at least two different SCS for transmitting the second RA preamble length, the one of at least two SCS being greater than the sub-carrier spacing for the first RA preamble length.

14. The baseband circuitry of claim 13, wherein the system information comprises a system information block (SIB).

15. A user equipment (UE), comprising:
    a memory; and
    one or more processors configured to, when executing instructions stored in the memory, cause the UE to:
    receive, from a base station, system information comprising a first random access (RA) preamble length and a second RA preamble length, the first RA preamble length and the second RA preamble length being configured based on shared spectrum channel access;
    generate a physical RA channel (PRACH) message comprising a RA preamble according to the second RA preamble length;
    send, to the base station, the PRACH message; and
    generate configured grant (CG) uplink control information (UCI) (CG-UCI) comprising an indication of no channel occupancy time (COT) sharing,
    wherein the CG-UCI is generated for a CG physical uplink shared channel (PUSCH), the CG-UCI corresponds to a UE-initiated COT, and the indication of the no COT sharing corresponds to an index associated with a row of a COT sharing table.

16. The UE of claim 15, wherein:
    the first RA preamble length is 139; and
    the second RA preamble length is 571.

17. The UE of claim 15, wherein:
    the first RA preamble length is 139; and
    the second RA preamble length is 1151.

18. A base station, comprising:
    a memory; and
    one or more processors configured to, when executing instructions stored in the memory, cause the base station to:
    communicate, to a user equipment (UE), system information comprising a first random access (RA) preamble length and a second RA preamble length, the first RA preamble length and the second RA preamble length being configured based on shared spectrum channel access;
    receive, from the UE, a physical RA channel (PRACH) message comprising a RA preamble according to the second RA preamble length; and
    receive, from the UE, configured grant (CG) uplink control information (UCI) (CG-UCI) comprising an indication of no channel occupancy time (COT) sharing,
    wherein the CG-UCI is generated for a CG physical uplink shared channel (PUSCH), the CG-UCI corresponds to a UE-initiated COT, and the indication of the no COT sharing corresponds to an index associated with a row of a COT sharing table.

19. The base station of claim 18, wherein:
the first RA preamble length is 139; and
the second RA preamble length is 571.

20. The base station of claim 18, wherein:
the first RA preamble length is 139; and
the second RA preamble length is 1151.

* * * * *